US010844826B2

(12) United States Patent
Yoneya et al.

(10) Patent No.: US 10,844,826 B2
(45) Date of Patent: Nov. 24, 2020

(54) INTERNAL COMBUSTION ENGINE CONTROL DEVICE

(71) Applicant: Hitachi Automotive Systems, Ltd., Hitachinaka (JP)

(72) Inventors: Naoki Yoneya, Tokyo (JP); Masayuki Saruwatari, Hitachinaka (JP); Kazuhiro Oryoji, Tokyo (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 77 days.

(21) Appl. No.: 16/300,439

(22) PCT Filed: Mar. 14, 2017

(86) PCT No.: PCT/JP2017/010053
§ 371 (c)(1),
(2) Date: Nov. 9, 2018

(87) PCT Pub. No.: WO2017/203798
PCT Pub. Date: Nov. 30, 2017

(65) Prior Publication Data
US 2019/0226443 A1 Jul. 25, 2019

(30) Foreign Application Priority Data

May 27, 2016 (JP) ................................. 2016-105753

(51) Int. Cl.
*F02P 5/15* (2006.01)
*F02P 5/152* (2006.01)
(Continued)

(52) U.S. Cl.
CPC ............. *F02P 5/152* (2013.01); *F02B 11/00* (2013.01); *F02B 47/08* (2013.01); *F02D 13/02* (2013.01);
(Continued)

(58) Field of Classification Search
CPC .......... F02D 13/02; F02D 15/00; F02D 15/04; F02D 19/06; F02D 21/08; F02D 41/02;
(Continued)

(56) References Cited

U.S. PATENT DOCUMENTS 6,267,100 B1   7/2001  Torno et al.
7,212,909 B2 *  5/2007  Yoshino ................ F02D 35/028
                                                    123/406.37
(Continued)

FOREIGN PATENT DOCUMENTS

EP   1 447 654 A1   8/2004
EP   1 571 331 A1   9/2005
(Continued)

OTHER PUBLICATIONS

International Search Report (PCT/ISA/210) issued in PCT Application No. PCT/JP2017/010053 dated Jun. 20, 2017 with English translation (six pages).

(Continued)

*Primary Examiner* — John Kwon
*Assistant Examiner* — Johnny H Hoang
(74) *Attorney, Agent, or Firm* — Crowell & Moring LLP

(57) ABSTRACT

An object of the present invention is to predict change of a combustion limit due to cycle variation of temperature and an EGR ratio and perform correction every cycle to decrease an amount of combustion consumption. Therefore, in an internal combustion engine control device that controls an internal combustion engine including a cylinder and an exhaust pipe, the internal combustion engine control device includes a control unit configured to perform EGR control of controlling an exhaust gas in the exhaust pipe to return to an inner cylinder of the cylinder, obtain temperature of the gas in the internal cylinder and an EGR ratio in a state where both an intake valve and an exhaust valve are closed in an (Continued)

combustion cycle, and correct a combustion parameter in a same combustion cycle as the combustion cycle on the basis of the obtained gas temperature and the obtained EGR ratio.

19 Claims, 15 Drawing Sheets

(51) Int. Cl.
| | |
|---|---|
| *F02M 26/01* | (2016.01) |
| *F02D 41/02* | (2006.01) |
| *F02D 19/06* | (2006.01) |
| *F02B 11/00* | (2006.01) |
| *F02M 26/06* | (2016.01) |
| *F02D 15/00* | (2006.01) |
| *F02D 45/00* | (2006.01) |
| *F02D 15/04* | (2006.01) |
| *F02D 13/02* | (2006.01) |
| *F02D 41/34* | (2006.01) |
| *F02B 47/08* | (2006.01) |
| *F02D 21/08* | (2006.01) |
| *F02D 41/18* | (2006.01) |
| *F02P 5/14* | (2006.01) |

(52) U.S. Cl.
CPC ............. *F02D 15/00* (2013.01); *F02D 15/04* (2013.01); *F02D 19/06* (2013.01); *F02D 21/08* (2013.01); *F02D 41/02* (2013.01); *F02D 41/182* (2013.01); *F02D 41/34* (2013.01); *F02D 45/00* (2013.01); *F02M 26/01* (2016.02); *F02M 26/06* (2016.02); *F02P 5/14* (2013.01); *F02P 5/15* (2013.01); *F02D 2021/083* (2013.01); *Y02T 10/12* (2013.01); *Y02T 10/30* (2013.01); *Y02T 10/40* (2013.01)

(58) Field of Classification Search
CPC ........ F02D 41/18; F02D 41/182; F02D 41/34; F02D 45/00; F02M 26/01; F02M 26/06; F02B 11/00; F02B 47/08; F02P 5/15; F02P 5/152; F02P 5/14
See application file for complete search history.

(56) References Cited

U.S. PATENT DOCUMENTS

| | | | |
|---|---|---|---|
| 2004/0159309 A1* | 8/2004 | Nagaishi | ............... F02D 35/026 123/406.34 |
| 2007/0245818 A1 | 10/2007 | Matekunas et al. | |
| 2013/0024089 A1 | 1/2013 | Wang et al. | |
| 2015/0114342 A1 | 4/2015 | Iwai et al. | |

FOREIGN PATENT DOCUMENTS

| | | |
|---|---|---|
| JP | 11-200934 A | 7/1999 |
| JP | 2005-351145 A | 12/2005 |
| JP | 2008-231995 A | 10/2008 |
| JP | 2010-285957 A | 12/2010 |
| JP | 2015-34474 A | 2/2015 |

OTHER PUBLICATIONS

Japanese-language Written Opinion (PCT/ISA/237) issued in PCT Application No. PCT/JP2017/010053 dated Jun. 20, 2017 (four pages).
Extended European Search Report issued in European Application No. 17802400.6 dated Jan. 2, 2020 (10 pages).

\* cited by examiner

ND UW844,826 B2

INTERNAL COMBUSTION ENGINE CONTROL DEVICE

TECHNICAL FIELD

The present invention relates to an internal combustion engine control device, and in particular to a control device that controls an internal combustion engine provided with an EGR device.

BACKGROUND ART

Conventionally, gasoline engines have been known in which a mixture of fuel and air is formed in a cylinder and combusted by ignition or self ignition. Generally, in this type of engine, ignition timing when fuel consumption is optimum is (MBT), that is, timing when the ignition timing is advanced to immediately before knocking occurs. An actual ignition timing map value to be stored in an ECU is set to timing slightly retarded from the knocking occurrence timing, in consideration of cycle variation of combustion.

In addition, as a characteristic technology of this type of engine, exhaust gas recirculation (EGR) is widely known, which causes an exhaust gas after combustion to be sucked into the cylinder again together with outside air and lowers combustion temperature of the air-fuel mixture to suppress the occurrence of knocking, and enables operation in a less fuel consumption state.

Since the EGR has knocking suppression effect, the knocking occurrence timing changes depending on an EGR ratio. Accordingly, the MBT also changes depending on the EGR ratio. Further, a ratio of an EGR gas in the air-fuel mixture (EGR ratio) varies in every cycle due to variation of a combustion state or an amount of intake air of a previous cycle.

JP 2008-231995 A (PTL 1) is a background technology related to EGR control of an internal combustion engine provided with such an EGR device. According to PTL 1, pressure change inside a combustion chamber is detected during a compression stroke, an EGR gas concentration in the air-fuel mixture is calculated on the basis of the detected pressure change, and ignition timing in the same cycle is corrected on the basis of calculated EGR gas temperature.

CITATION LIST

Patent Literature

PTL 1: JP 2008-231995 A

SUMMARY OF INVENTION

Technical Problem

Since knocking is more likely to occur as the temperature of the air-fuel mixture is higher, knocking occurrence timing changes depending on change of the air-fuel mixture temperature. Accordingly, the MBT also changes depending on the air-fuel mixture temperature. Especially, since a high-temperature exhaust gas remains in internal EGR in which the exhaust gas is directly brought back from an exhaust port, the temperature of the air-fuel mixture in the compression stroke greatly varies from cycle to cycle.

However, in PTL 1, the temperature change of the air-fuel mixture is not considered, and the ignition timing is corrected by a map stored in advance corresponding to only the calculated EGR ratio. Then, in a case where actual air-fuel mixture temperature is higher than air-fuel mixture temperature assumed when a map value is determined, knocking may occur due to excessive advancement. Conversely, in a case where the actual air-fuel mixture temperature is lower than the assumed air-fuel mixture temperature, the ignition timing is unnecessarily retarded from an optimum fuel consumption point and there is a problem of an increase in an amount of fuel consumption.

An object of the present invention is to predict change of a combustion limit due to cycle variation of temperature and an EGR ratio and perform correction every cycle to decrease an amount of combustion consumption.

Solution to Problem

To solve the above problem, as an example of means, for example, in an internal combustion engine control device that controls an internal combustion engine including a cylinder and an exhaust pipe, the internal combustion engine control device includes a control unit configured to perform EGR control of controlling an exhaust gas in the exhaust pipe to return to an inner cylinder of the cylinder, obtain temperature of the gas in the internal cylinder and an EGR ratio in a state where both an intake valve and an exhaust valve are closed in an combustion cycle, and correct a combustion parameter in a same combustion cycle as the combustion cycle on the basis of the obtained gas temperature and the obtained EGR ratio.

Advantageous Effects of Invention

According to the present invention, ignition timing can be brought close to a fuel consumption optimum point in each cycle in consideration of cycle variation of air-fuel mixture temperature and an EGR ratio, and an amount of combustion consumption can be reduced.

DESCRIPTION OF EMBODIMENTS

Hereinafter, embodiments of the present invention will be described with reference to the drawings.

First Embodiment

Hereinafter, a configuration and an operation of an engine control device according to a first embodiment of the present invention will be described with reference to FIGS. 1 to 6.

Figure 1:
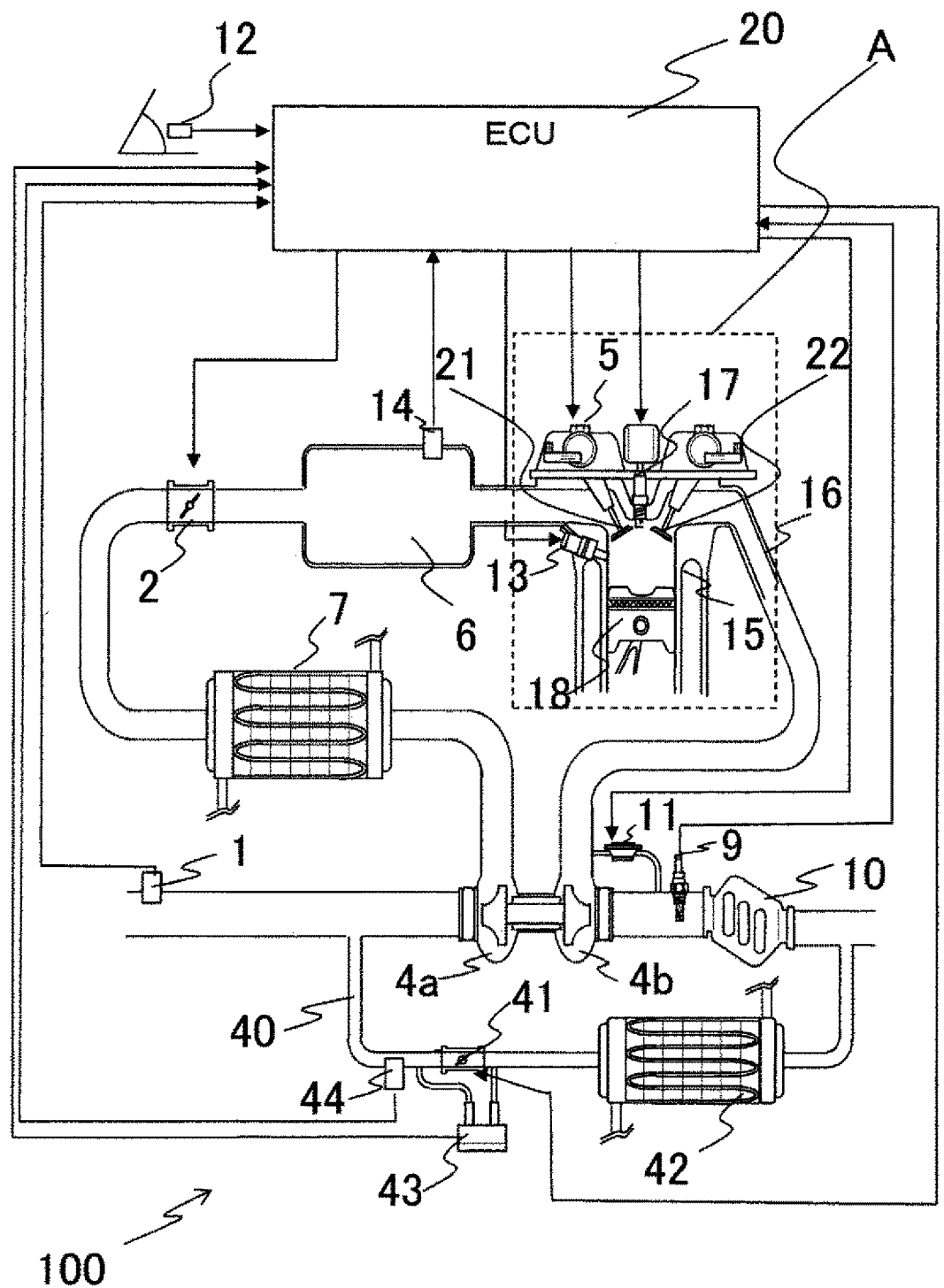
FIG. 1 is a system configuration diagram in which an engine control device according to a first embodiment of the present invention is applied to a cylinder injection-type gasoline engine for automobiles.

FIG. 1 is a system configuration diagram in which the engine control device according to the first embodiment of the present invention is applied to a cylinder injection-type gasoline engine for automobiles.

An engine 100 is a four-cylinder gasoline engine for automobiles that performs spark ignition combustion. An air flow sensor 1 that measures an amount of intake air, a compressor 4a of a supercharger for supercharging intake air, an intercooler 7 for cooling the intake air, an electronically controlled throttle 2 that adjusts a pressure in an intake pipe 6, and an intake pressure sensor 14 that measures the pressure in the intake pipe 6 are provided in the intake pipe 6. Further, an engine 100 includes, for each cylinder, a fuel injection device (hereinafter referred to as an injector) 13 that injects a fuel into a cylinder 15 of each cylinder, a piston 18 for compressing an air-fuel mixture of the injected fuel and the air, and an ignition plug 17 that supplies ignition energy. Further, variable valve timing mechanisms 5a (intake side) and 5b (exhaust side) that adjusts a gas flowing into or out of the cylinder are provided in a cylinder head. The variable valve timings mechanisms 5a and 5b adjust valve opening and closing timing of intake valves 21 and exhaust valves 22 of all the first to four cylinders, thereby to adjust an amount of intake air and an amount of internal EGR. Further, although not illustrated, a high-pressure fuel pump for supplying a high-pressure fuel to the injector 13 is connected to the injector 13 with fuel piping, and a fuel pressure sensor for measuring a fuel injection pressure is disposed in the fuel piping.

Further, a turbine 4b for imparting a rotational force to the compressor 4a of the supercharger by exhaust energy, an electronically controlled waste gate valve 11 for adjusting an exhaust flow rate of an exhaust gas flowing in the turbine, a three-way catalyst 10 that purifies the exhaust gas, and an air-fuel ratio sensor 9 that is a form of an air-fuel ratio detector and detects an air-fuel ratio of the exhaust gas on an upstream side of the three-way catalyst 10 are provided in an exhaust pipe 16. Further, a crank angle sensor for calculating a rotation angle is provided on a crankshaft although not illustrated.

Furthermore, an EGR pipe 40 for returning the exhaust gas from a downstream side of the catalyst 10 in the exhaust pipe to an upstream side of the compressor 4a of the intake pipe 6 is provided. In addition, an EGR cooler 42 for cooling EGR, an EGR valve 41 for controlling an EGR flow rate, a differential pressure sensor 43 that detects a differential pressure between the front and rear of the EGR valve, and an EGR temperature sensor 44 that detects EGR temperature are attached to appropriate positions of the EGR pipe 40.

Signals obtained from the air flow sensor 1, the air-fuel ratio sensor 9, the intake pressure sensor 14, the differential pressure sensor 43, and the EGR temperature sensor 44 are sent to an engine control unit (ECU) 20. Further, a signal obtained from an accelerator opening sensor 12 is sent to the ECU 20. The accelerator opening sensor 12 detects a stepping-in amount of an accelerator pedal, that is, an accelerator opening degree. The ECU 20 calculates required torque on the basis of an output signal of the accelerator opening sensor 12. That is, the accelerator opening sensor 12 is used as a required torque detection sensor that detects the required torque to the engine. Further, the ECU 20 calculates a rotational speed of the engine on the basis of an output signal of the crank angle sensor. The ECU 20 optimally calculates main operating amounts of the engine such as an air flow rate, a fuel injected amount, ignition timing, a fuel pressure, and the like on the basis of an operation state of the engine obtained from the outputs of the above-described various sensors.

The fuel injected amount calculated by the ECU 20 is converted into a valve opening pulse signal and sent to the injector 13. Further, an ignition signal is sent to the ignition plug 17 so as to be ignited at the ignition timing calculated by the ECU 20. Further, a throttle opening degree calculated by the ECU 20 is sent to the electronically controlled throttle 2 as a throttle drive signal. Further, an operating amount of the variable valve timing mechanisms calculated by the ECU 20 is sent to the variable valve timing mechanisms 5 as a variable valve timing mechanisms drive signal. Further, a waste gate valve opening degree calculated by the ECU 20 is sent to the waste gate valve 11 as a waste gate valve drive signal. Further, an EGR valve opening degree that is constantly calculated by the ECU 20 is sent to the EGR valve 41 as an EGR valve opening degree drive signal.

The fuel is injected into the air flowing into the cylinder 15 through the intake pipe 6 and the intake valve 21 to form the air-fuel mixture. The air-fuel mixture explodes by a spark generated from the ignition plug 17 at predetermined ignition timing and pushes down a piston by a combustion pressure to become a drive force of the engine. Further, an exhaust gas after the explosion is sent to the three-way catalyst 10 through the exhaust pipe 16, and an exhaust component is purified inside the three-way catalyst 10 and discharged to the outside.

Figure 2:
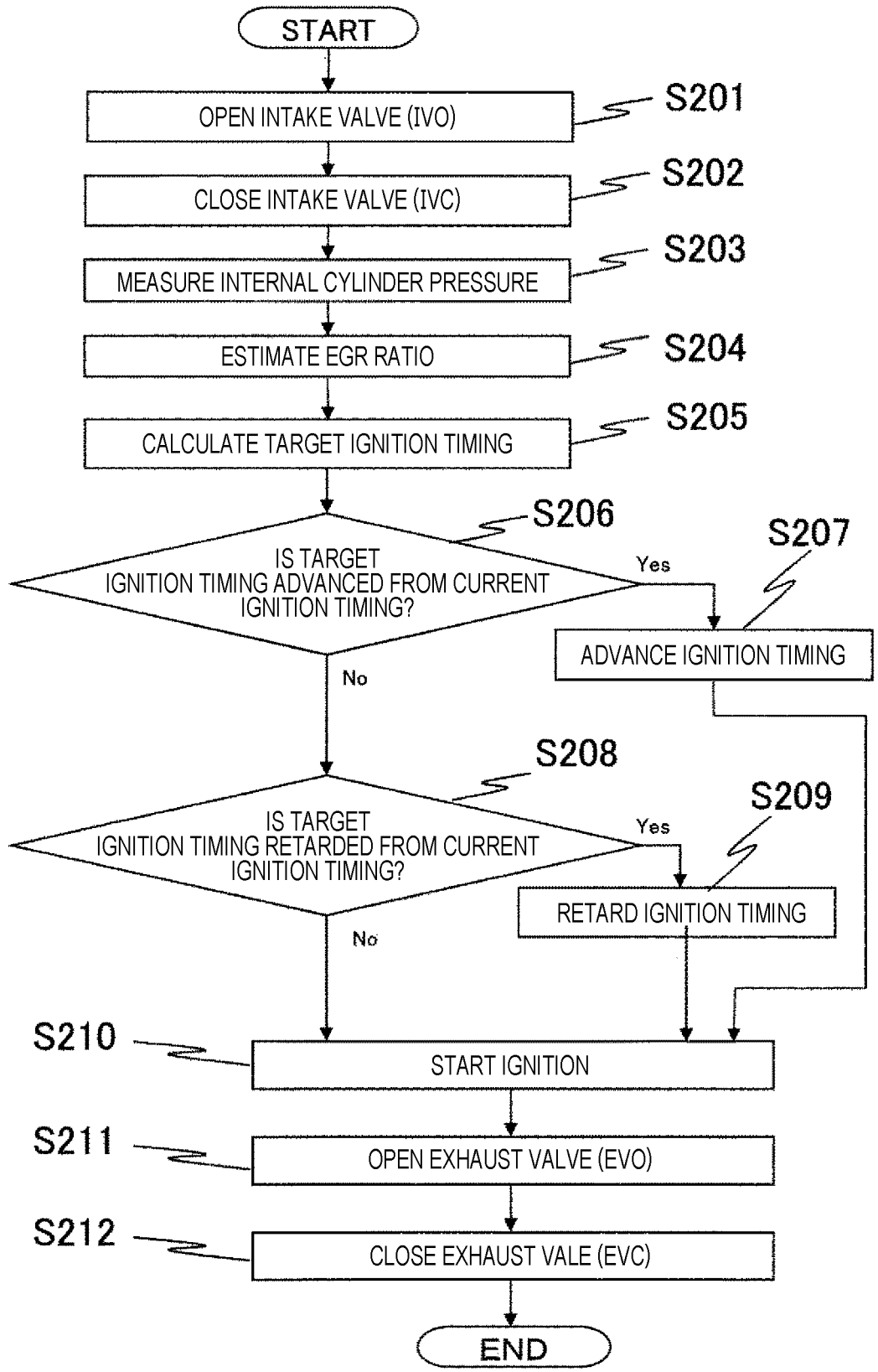
FIG. 2 is a system block diagram illustrating an example of ignition timing correction control in one cycle of a typical engine control device.

FIG. 2 is a system block diagram illustrating an example of ignition timing correction control in one cycle of a typical engine control device. The ECU 20 includes a central processing unit (CPU), and the CPU functions as a control unit. Then, the control unit of the ECU 20 opens the intake valve 21 (Intake Valve Opening) in step S201, performs intake, closes the intake valve 21 (Intake Valve Closing) in S202, and controls the intake valve 21 to start compression. Further, the control unit of the ECU 20 acquires a measurement value of an internal cylinder pressure in S203, estimates an EGR ratio from the measured value of the internal cylinder pressure in S204, and calculates an ignition timing correction value in S205 on the basis of the estimated EGR ratio. Further, the control unit of the ECU 20 compares the ignition timing correction value with a current ignition timing desired value in S206. In a case where the ignition timing correction value is advanced from the ignition timing desired value, the ignition timing desired value is advanced to become equal to the ignition timing correction value in S207. On the other hand, the ignition timing correction value is compared with the current ignition timing desired value in S206. In a case where the ignition timing correction value is not advanced from the ignition timing desired value, the processing proceeds to S208. In a case where the ignition timing correction value is retarded from the ignition timing desired value in S208, the ignition timing desired value is retarded to become equal to the ignition timing correction value in S209.

Thereafter, the control unit of the ECU 20 ignites the ignition plug 17 in S210 and starts combustion in the cylinder of the cylinder 15. Then, the control unit of the ECU 20 opens the exhaust valve 22 (Exhaust Valve Opening) in S211, performs exhaust, closes the exhaust valve 22 (Exhaust Valve Closing) in S212, and terminates one cycle.

The air-fuel mixture that is a gas confined in the internal cylinder at the time when the intake valve 21 and the exhaust valve 22 are closed is constituted by air taken from the outside, an EGR gas that is a remaining post-combustion gas of a previous cycle, and the fuel injected in the internal cylinder. The mass ratio of gas other than oxygen, the gas not contributing to combustion, in the air-fuel mixture is called EGR ratio.

Here, in S204, the ignition timing correction value is determined according to the EGR ratio, but optimum ignition timing changes depending on air-fuel mixture temperature. Especially, since a high-temperature exhaust gas remains in internal EGR in which the exhaust gas is directly brought back from an exhaust port, the temperature of the air-fuel mixture in the compression stroke greatly varies from cycle to cycle. Then, in a case where actual air-fuel mixture temperature is higher than air-fuel mixture temperature assumed when the ignition timing desired value is set, knocking may occur due to excessive advancement of the ignition timing. Conversely, in a case where the actual air-fuel mixture temperature is lower than the air-fuel mixture temperature, the ignition timing is unnecessarily retarded from an optimum fuel consumption point and there is a problem of an increase in an amount of fuel consumption.

Figure 3:
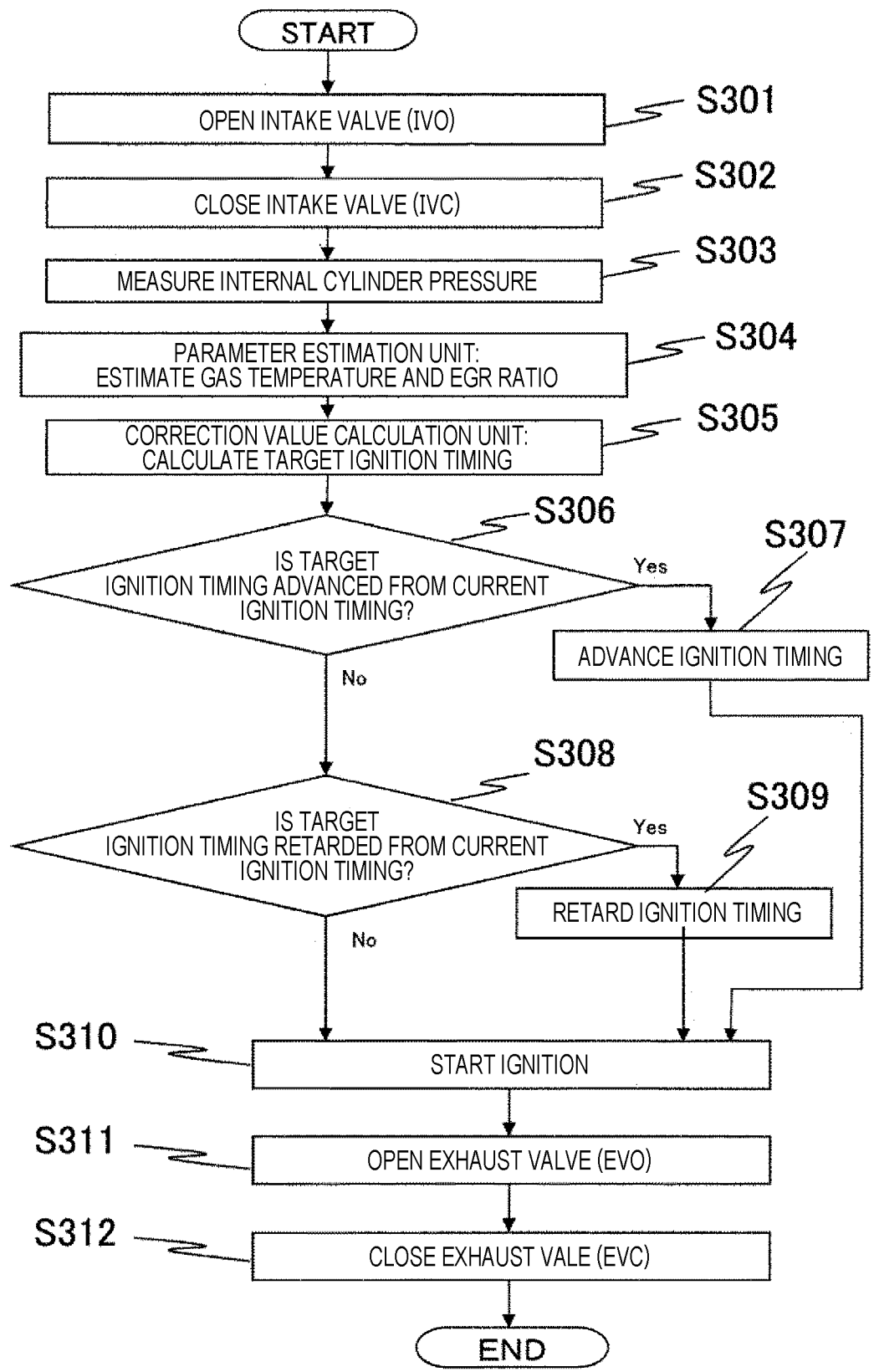
FIG. 3 is a system block diagram illustrating an example of ignition timing correction control in one cycle according to the first embodiment of the present invention.

FIG. 3 is a system block diagram illustrating an example of ignition timing correction control in one cycle according to the first embodiment of the present invention. S301 to S303 and S306 to S312 are similar to S201 to S203 and S206 to S212 in FIG. 2, and therefore detailed description thereof is omitted. In the present embodiment, the control unit of the ECU 20 estimates, by a parameter estimation unit in S304, the gas temperature and the EGR ratio of the compression stroke from the internal cylinder pressure obtained in S303.

Thereafter, the control unit of the ECU 20 calculates the ignition timing correction value by a correction value calculation unit in S305 on the basis of the gas temperature and the EGR ratio. Then, the control unit of the ECU 20 performs processing from S306 to S309 for the calculated ignition timing correction value to correct the ignition timing desired value before the start of combustion.

Figure 4:
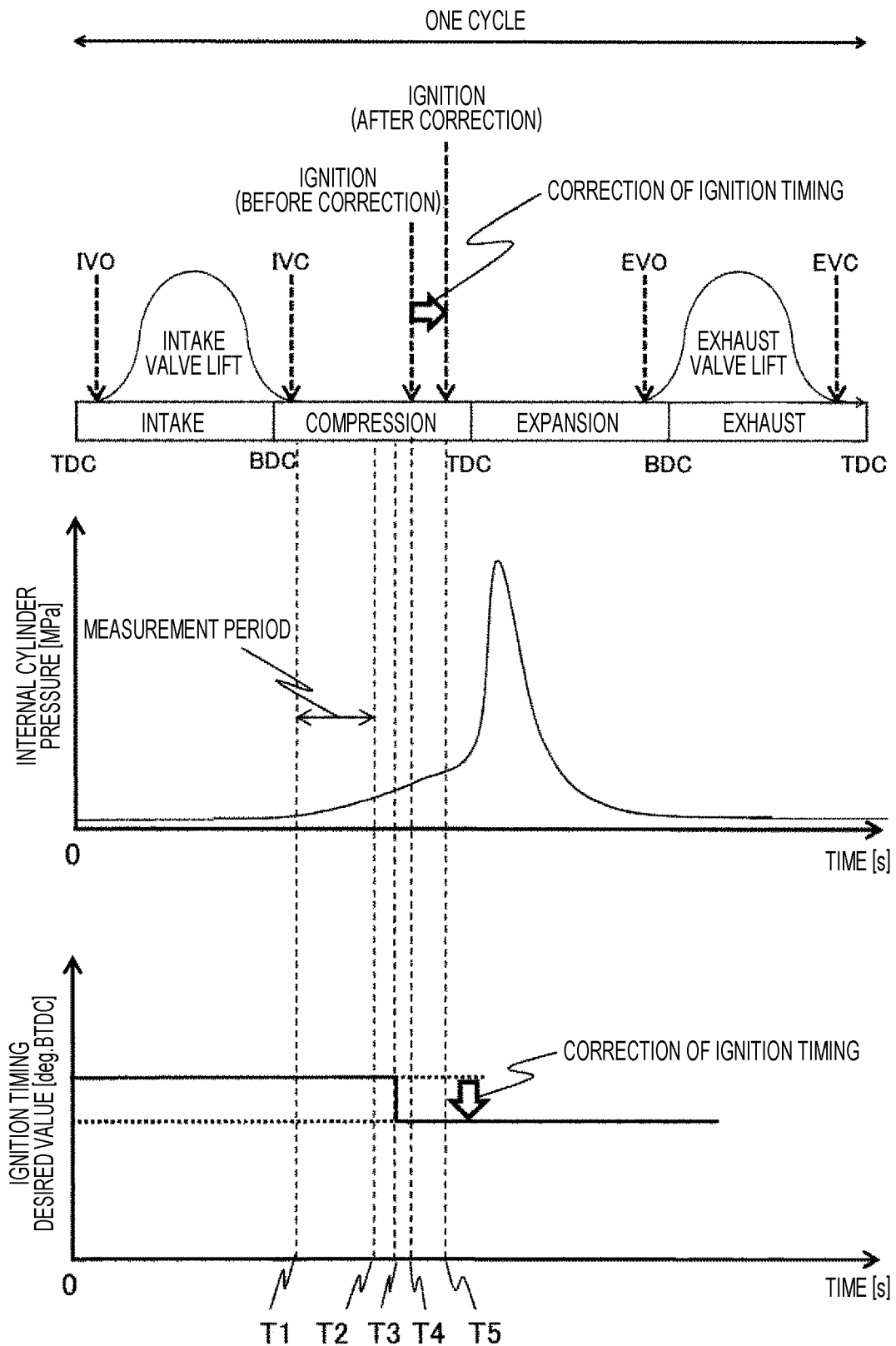
FIG. 4 is a diagram for describing operation of intake/exhaust valves in one cycle and a time chart illustrating temporal change of an internal cylinder pressure and an ignition timing map value in the engine control device according to the first embodiment of the present invention.

FIG. 4 is a diagram for illustrating operation of intake/exhaust valves in one cycle and a time chart illustrating temporal change of an internal cylinder pressure of the cylinder 15 and an ignition timing desired value in the engine control device according to the first embodiment of the present invention. The upper part of FIG. 4 illustrates lift of the intake valve 21 and the exhaust valve 22.

When the intake valve 21 is closed at time T1 and an intake stroke is completed, a compression stroke starts, and the internal cylinder pressure illustrated in the middle part of FIG. 4 starts to rise from a pressure P1 at the time T1. By measuring an internal cylinder pressure P2 at time T2 when the compression stroke has advanced, pressure change (P2−P1) between two points can be obtained. Further, internal cylinder volumes V1 and V2 can also be obtained from a detection value of a crank angle. The gas temperature and the EGR ratio are estimated by the parameter estimation unit in S304 from these measurement values and at least one of an air-fuel ratio and an intake air mass. The ignition timing correction value is calculated by the correction value calculation unit in S305 on the basis of the estimated gas temperature and the estimated EGR ratio.

The lower part of FIG. 4 illustrates the ignition timing desired value stored by the ECU, and the ignition timing desired value is rewritten on the basis of the correction value at time T3. In the ignition timing desired value up to a previous combustion cycle, the ignition was supposed to be performed at time T4. However, the ignition timing in this combustion cycle has become time T5 because the desired value has been rewritten at the time T3. At time T5, the ignition with corrected start timing is performed, the combustion starts, and the internal cylinder pressure reaches a peak. Thereafter, in an expansion stroke, the internal cylinder pressure decreases, the exhaust valve 22 is opened, the gas after combustion is discharged, the pressure nearly drops to an atmospheric pressure, then the exhaust valve 22 is closed, and one combustion cycle is completed.

As described above, in the present embodiment, the control unit of the ECU 20 obtains the temperature of the gas in the internal cylinder and the EGR ratio in the state where both the intake valve 21 and the exhaust valve 22 are closed in the combustion cycle, and corrects a combustion parameter in a combustion cycle that is the same as the combustion cycle on the basis of the obtained gas temperature and the EGR ratio.

More specifically, the control unit of the ECU 20 corrects the ignition timing of the ignition plug 17 in the same combustion cycle as the combustion cycle on the basis of the obtained gas temperature and the obtained EGR ratio.

Timing to obtain the gas temperature and the EGR ratio is favorably before ignition in the compression stroke, and then the correction value of the ignition timing is calculated. Note that an ignition coil (not illustrated) for supplying a high voltage to the ignition plug 17 that performs ignition is attached to the internal combustion engine (engine 100). Then, the control unit of the ECU 20 corrects rising timing of a secondary-side coil current of the ignition coil in the same combustion cycle as the combustion cycle on the basis of the obtained gas temperature and the EGR ratio.

Figure 5:
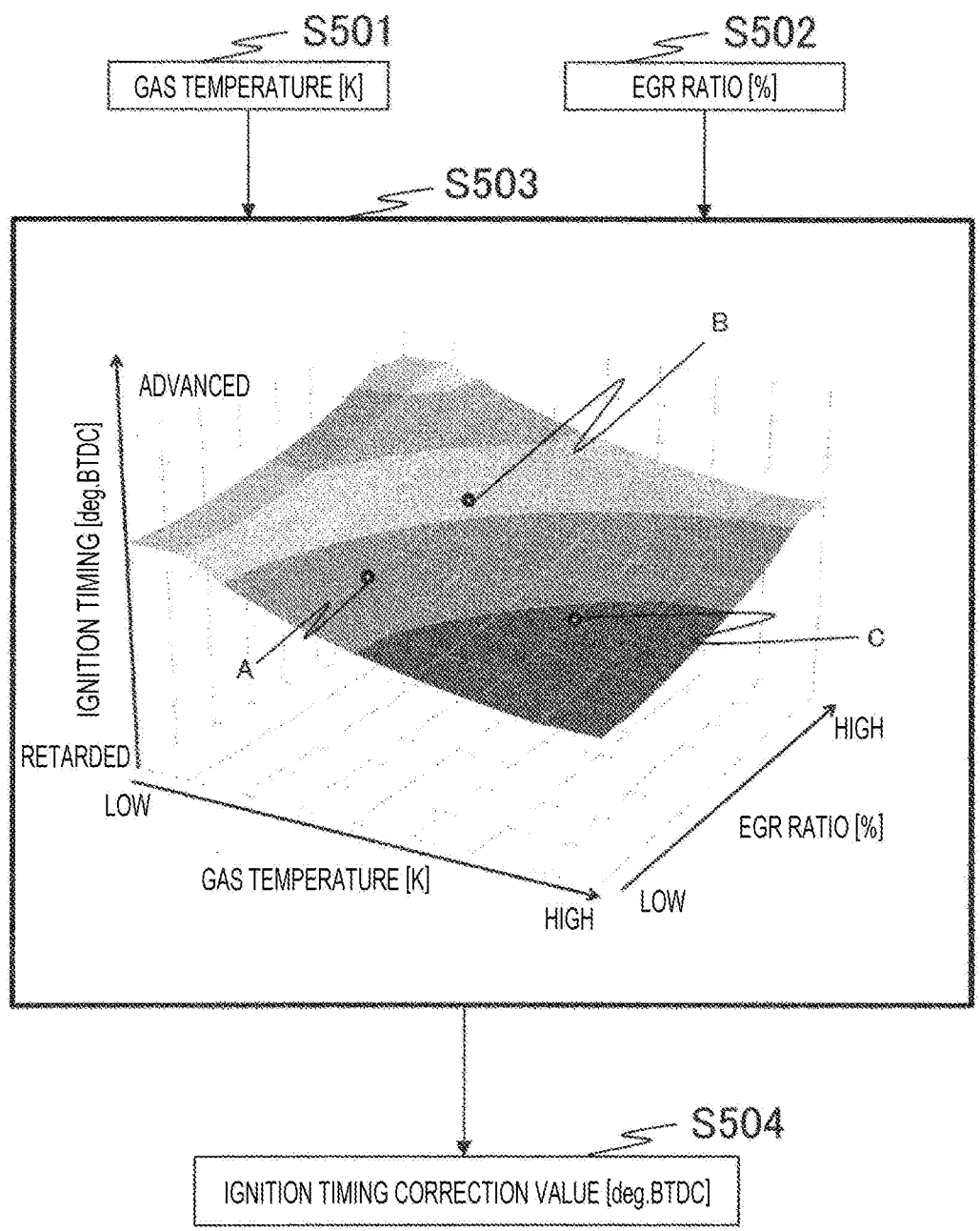
FIG. 5 is a diagram for describing an ignition timing map correction value corrected on the basis of gas temperature and an EGR ratio in the engine control device according to the first embodiment of the present invention.

FIG. 5 is a diagram illustrating a map of the ignition timing correction value for correcting the ignition timing desired value on the basis of the gas temperature and the EGR ratio in the engine control device according to the first embodiment of the present invention. First, the gas temperature is acquired in S501, and then the EGR ratio is acquired in S502. In S503, the ignition timing correction value is calculated from these two values on the basis of the ignition timing correction value map in FIG. 5.

The approximate shape of the ignition timing correction value map is expressed as a three-dimensional curved surface with respect to the gas temperature and the EGR ratio as illustrated in FIG. 5. As illustrated in the ignition timing correction value map in FIG. 5, the ignition timing correction value is set to an advancement side as the EGR ratio becomes higher in the case where the gas temperature is constant. This is because, in EGR, knocking is suppressed as an inert gas is mixed into the air-fuel mixture, the advance limit is expanded, and the ignition timing can be further advanced. Further, the ignition timing correction value is set to retard the ignition timing desired value as the gas temperature is higher in the case where the EGR ratio is constant. This is because knocking is more likely to occur as the air-fuel mixture temperature is higher, the advance limit becomes small, and the ignition timing cannot be advanced.

That is, the control unit of the ECU 20 performs correction to retard the ignition timing of the ignition plug 17 in the same combustion cycle as the combustion cycle as the obtained gas temperature is larger or the obtained EGR ratio is smaller. Conversely, the control unit of the ECU 20 performs correction to advance the ignition timing (ignition timing desired value) of the ignition plug 17 in the same combustion cycle as the combustion cycle as the obtained gas temperature is smaller or the obtained EGR ratio is larger. In other words, the ignition timing correction value map as illustrated in FIG. 5 is stored in a storage unit (not illustrated) of the ECU 20. Then, in this ignition timing correction value map, the ignition timing (ignition timing correction value) is set by the gas temperature and the EGR ratio as illustrated in FIG. 5, and the ignition timing is set to be retarded as the gas temperature is larger or the EGR ratio is smaller. Then, in the compression process of a certain combustion cycle, the control unit corrects the ignition timing (ignition timing desired value) in the same combustion cycle as the combustion cycle, before ignition of the ignition plug 17, to become the ignition timing (ignition timing correction value) set from the obtained gas temperature and the obtained EGR ratio on the basis of the stored ignition timing correction value map.

Note that, when the EGR ratio roughly exceeds 30%, combustion becomes less stable even if ignition is advanced due to deterioration of combustion stability. Therefore, in a case where the EGR ratio becomes equal to or larger than a set value (for example, 30%), a correction value of the ignition timing correction value map is set not to advance the ignition. Similarly, if the gas temperature becomes too low, evaporation of the fuel becomes insufficient and heterogeneity occurs in the air-fuel mixture, and the combustion stability is deteriorated. Therefore, combustion becomes less stable even if the ignition is advanced. Therefore, the correction value of the ignition timing correction value map is not advanced beyond a certain level with respect to the decrease in the gas temperature. Further, if the gas temperature is too high, preignition in which the air-fuel mixture is self-ignited before the ignition occurs, which may lead to breakage of a cylinder and a piston. Therefore, the correction value of the ignition timing correction value map is not retarded beyond a certain level with respect to the increase in the gas temperature.

Here, external EGR and internal EGR are used as an example, ignition timing correction processes for the respective cases will be described.

In the external EGR, the exhaust gas is taken out to the EGR pipe 40 from the downstream side of the catalyst 10 of the exhaust pipe in FIG. 1, and the exhaust gas is cooled to a predetermined temperature by the EGR cooler 42, and is then returned to the upstream side of the compressor 4a on the intake pipe 6. The EGR by this method is called external EGR in order to be distinguished from the internal EGR to be described below. The amount of the exhaust gas recirculated by the external EGR is controlled to be constant by the EGR valve 41. Here, since the composition of the exhaust gas varies due to variation of the air-fuel ratio and the amount of intake air in the previous combustion cycle, the EGR ratio varies in every combustion cycle.

Therefore, in a certain combustion cycle, the EGR ratio may increase or decrease in the next combustion cycle, as compared with the previous combustion cycle, even if combustion is performed at the temperature and the EGR ratio of point A in FIG. 5. In the case where the EGR ratio increases, knocking is suppressed and the advance limit of the ignition timing is expanded. Therefore, the optimum ignition timing is moved to the advancement side. Conversely, in the case where the EGR ratio decreases, the knocking suppression effect decreases and the advance limit of the ignition timing is reduced. Therefore, the optimum ignition timing is moved to the retardation side. In the engine control device according to the present embodiment, in the case where the EGR ratio increases, for example, the gas temperature and the EGR ratio are identified to be in a state of B point where the EGR ratio is higher than that in the previous combustion cycle, and the ignition timing desired value is corrected to be advanced on the basis of the ignition timing correction value map.

In the internal EGR, valve timing to confine the exhaust gas in an exhaust stroke into the internal cylinder is set using the variable valve timing mechanism 5, whereby the exhaust gas is recirculated in the next combustion cycle in FIG. 1. EGR by this method is called internal EGR. The amount of the exhaust gas to be recirculated by the internal EGR is determined by the intake and exhaust valve timing, but the EGR ratio varies due to variation of the amount of intake air of each combustion cycle, the difference in valve sealing performance, and the like. In addition, since a high-temperature exhaust gas is left in the internal cylinder in the internal EGR, the gas temperature also varies.

Therefore, for example, when combustion is being performed at the temperature and the EGR ratio of the point A in FIG. 5, both the temperature and the EGR ratio in the next combustion cycle may increase or decrease as compared with the previous combustion cycle. Expansion and reduction of the advance limit are seen as described above with respect to the increase and decrease in the EGR ratio. In the case where the temperature rises, an unburnt gas becomes easily self-ignited and approaches a knocking occurrence condition. Therefore, the advance limit of the ignition timing is reduced, and the optimum ignition timing is moved to the retardation side. In the case where the temperature lowers, self ignition of the unburned gas is suppressed and knocking is suppressed. Therefore, the advance limit of the ignition timing is expanded, and the optimum ignition timing is moved to the advancement side. The engine control device according to the present embodiment identifies the gas temperature and the EGR ratio to be in a state of point C where the EGR is higher and the gas temperature is higher than those in the previous combustion cycle, in the case where the EGR ratio increases and the gas temperature rises due to an increase in the internal EGR, and corrects the ignition timing desired value to be retarded on the basis of the ignition timing correction map.

In this way, the engine control device according to the present embodiment obtains the temperature of the gas in the internal cylinder and the EGR ratio before ignition in the compression stroke, and corrects the ignition timing desired value in the compression stroke before ignition of the ignition plug 17 on the basis of the obtained gas temperature and the obtained EGR ratio, thereby to bring the ignition timing closer to the fuel consumption optimum point for each combustion cycle in consideration of combustion cycle variation of the gas temperature and the EGR ratio, and to decrease the amount of fuel consumption.

Figure 6:
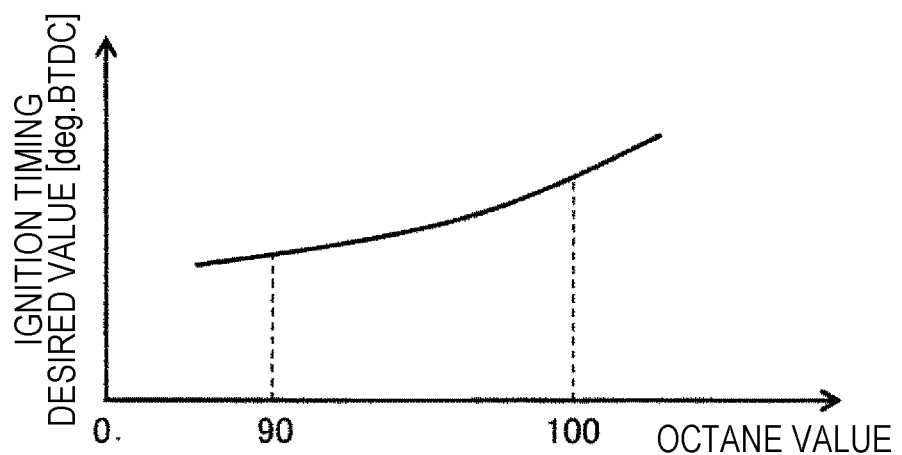
FIG. 6 is a graph illustrating a relationship between a fuel octane number and an ignition timing correction map value in an engine control device according to the first embodiment of the present invention.

FIG. 6 is a graph illustrating a relationship between a fuel octane number and the ignition timing correction map value in the engine control device according to the first embodiment of the present invention. The possibility of knocking depends on the fuel type as well and in the case of general gasoline, knocking is suppressed as the octane number is higher.

The engine control device according to the present embodiment detects the octane number of the fuel to be used, and corrects the ignition timing correction value map value in an advancing direction as the octane number is higher. Further, the engine control device according to the present embodiment sets the ignition timing correction value map to move the ignition timing desired value in a retarding direction as the octane number is lower.

Since the above correction is performed for all of points on the ignition timing correction value map in FIG. 5, the entire map in FIG. 5 is moved in parallel in the advance or retarding direction depending on a high or low octane number.

In this way, the ignition timing correction value map is corrected on the basis of the fuel octane number, whereby even when the fuel type is different, combustion can be performed at near optimum ignition timing, and the amount of fuel consumption can be decreased.

Second Embodiment

In a second embodiment, an embodiment of a configuration and an operation of an engine control device in a case of correcting a compression ratio as a method of correcting a combustion parameter other than ignition timing by a control unit of an ECU 20 will be described using FIGS. 7 to 9. Description of similar configurations to the first embodiment will be omitted.

Figure 7:
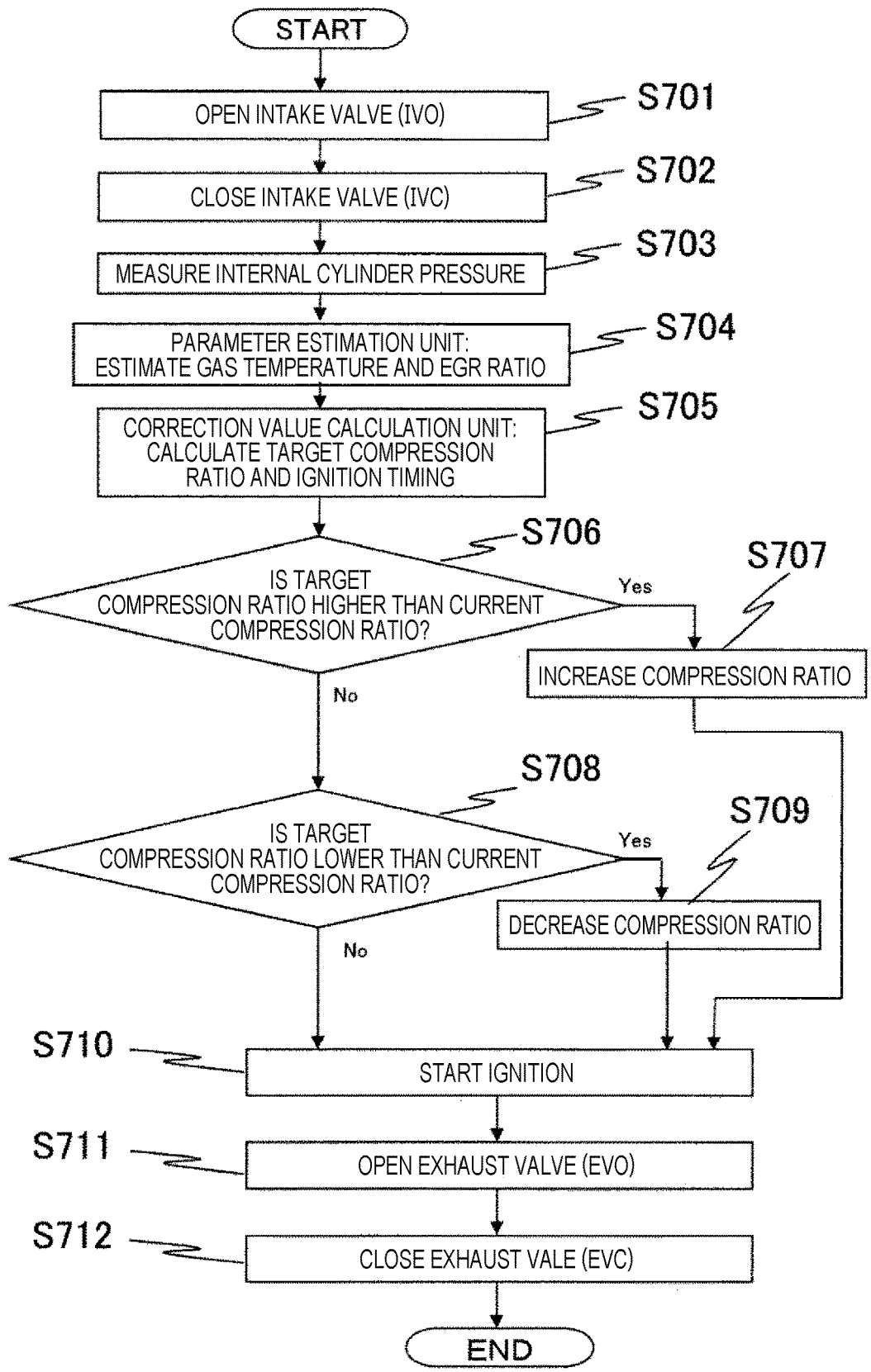
FIG. 7 is a system block diagram illustrating an example of compression ratio correction control in one cycle according to a second embodiment of the present invention.

FIG. 7 is a system block diagram illustrating an example of compression ratio correction control in one combustion cycle according to the second embodiment of the present invention. S701 to S704 and S706 to S712 are similar to S201 to S204 and S206 to S212 in FIG. 2, and therefore detailed description thereof is omitted. In the present embodiment, the control unit of the ECU 20 calculates a correction value of the compression ratio by a correction value calculation unit in S705 on the basis of gas temperature and an EGR ratio.

Generally, theoretical thermal efficiency is improved and an amount of fuel consumption decreases as the compression ratio is higher. However, the gas tends at a compression top dead center becomes high, and thus knocking easily occurs. Conversely, the theoretical thermal efficiency lowers and the amount of fuel consumption increases as the compression ratio is lower. However, the gas temperature at the compression top dead center becomes low, and thus knocking less easily occurs. Change of the compression ratio requires mechanical change of the shape of a combustion chamber, an amount of stroke of a piston, and the like, needs a longer time required than ignition timing change, and is not generally used as knocking avoidance means. However, in avoiding knocking, if only retardation of ignition timing is performed, the combustion efficiency lowers and the amount of fuel consumption may increase, as compared with a case of decreasing the compression ratio. Therefore, in avoiding knocking, the amount of fuel consumption is decreased by a decrease in the compression ratio or a combination of the decrease in the compression ratio and the retardation of the ignition timing in consideration of time until the ignition timing.

A compression ratio correction value is stored in a storage unit of the ECU 20 according to the time until the ignition timing. The correction value calculation unit of the compression ratio of ECU 20 outputs the compression ratio correction value such that the compression ratio becomes smaller as the gas temperature rises or the EGR ratio lowers on the basis of a stored compression ratio correction value map, and the control unit controls the compression ratio on the basis of the output. The compression ratio correction value is set to give time until the ignition timing, and an ignition plug 17 is ignited after the compression ratio is corrected. That is, in a case where time to ignition is smaller than time to perform the compression ratio change, a compression ratio corrected amount is set to become small, and the ignition timing correction value is output to supplement a shortage by ignition timing correction. The control unit of the ECU 20 performs processing from S706 to S709 for the compression ratio correction value output from the correction value calculation unit, and the compression ratio is corrected before the start of combustion. Then, the control unit of the ECU 20 corrects the ignition timing on the basis of the gas temperature and the EGR ratio as described in the first embodiment at the corrected compression ratio. That is, in the present embodiment, the ignition timing correction value map in FIG. 5 of the first embodiment is stored in the storage unit of the ECU 20 for each compression ratio.

Figure 8:
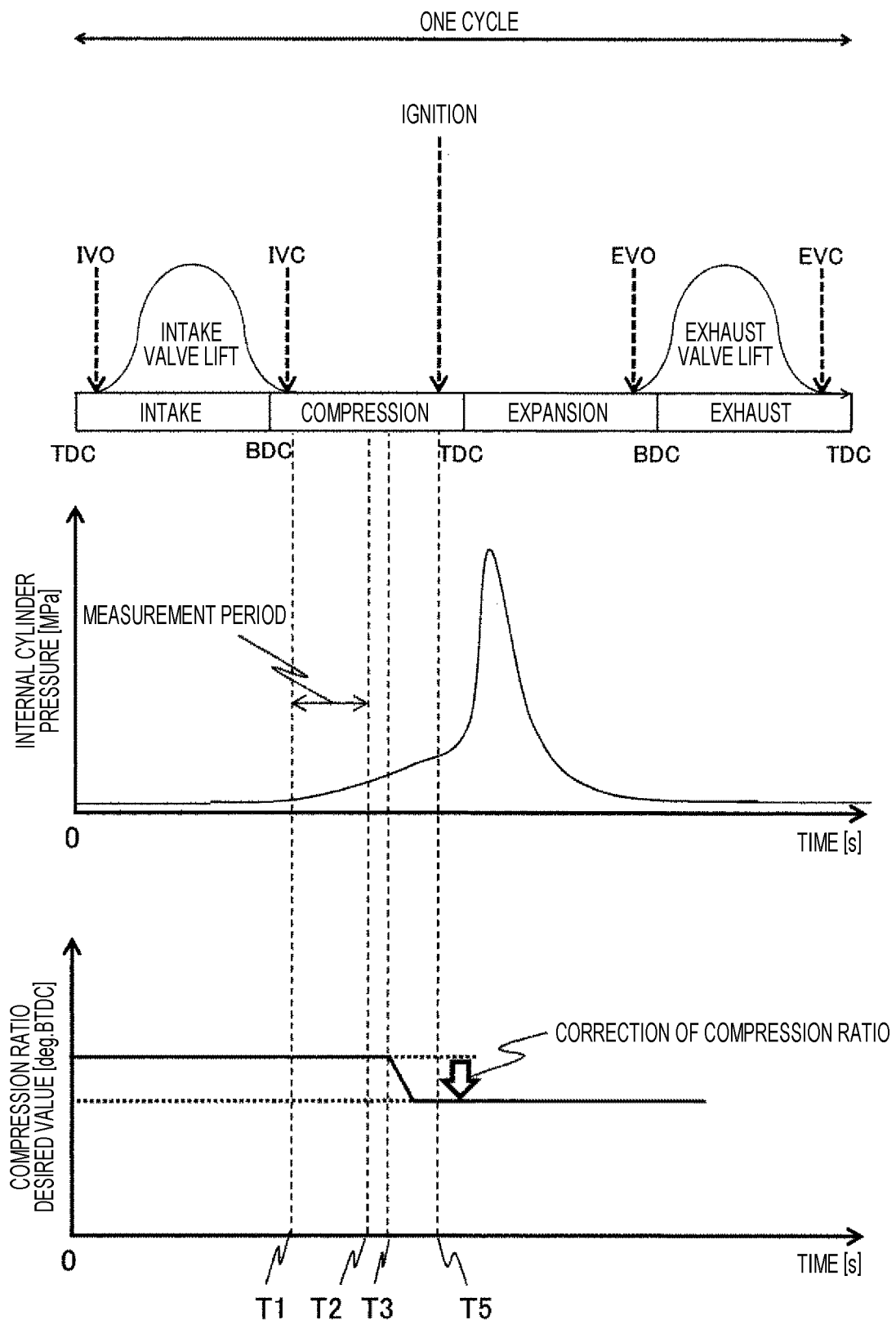
FIG. 8 is a diagram for describing operation of intake/exhaust valves in one cycle and a time chart illustrating temporal change of an internal cylinder pressure and a compression ratio in an engine control device according to the second embodiment of the present invention.

FIG. 8 illustrates operation of intake/exhaust valves in one combustion cycle and a time chart illustrating temporal change of an internal cylinder pressure and a compression ratio map value in an engine control device according to the second embodiment of the present invention. When an intake valve 21 is closed at time T1 and an intake stroke is completed, a compression stroke starts, and internal cylinder pressures P1 and P2 and internal cylinder volumes V1 and V2 can be obtained by time T2 in the middle of the compression stroke. A parameter estimation unit of the ECU 20 estimates the gas temperature and the EGR ratio from these measurement values and at least one of an air-fuel ratio and an intake air mass in S704. In S705, the correction value calculation unit calculates a compression ratio correction value on the basis of the compression ratio correction value map stored in the storage unit.

The lower part of FIG. 8 illustrates a corrected compression ratio desired value. At time T3, at time T5, the control unit (correction value calculation unit) of the ECU 20 corrects the compression ratio and then controls the ignition plug 17 to be ignited to start combustion, and an internal cylinder pressure approaches a peak. Thereafter, in an expansion stroke, the internal cylinder pressure decreases, an exhaust valve 22 is opened, the gas after combustion is discharged, the pressure nearly drops to an atmospheric pressure, then the exhaust valve 22 is closed, and one combustion cycle is completed.

In this way, the temperature of the gas in the internal cylinder and the EGR ratio before ignition in the compression stroke are obtained, and the compression ratio in the compression stroke is corrected on the basis of the obtained gas temperature and the obtained EGR ratio, whereby combustion can be performed at a fuel consumption optimum point in each combustion cycle without disadvantages by the ignition timing correction, such as occurrence of HC due to ignition advancement and rise of exhaust gas temperature due to ignition retardation, and an amount of fuel consumption can be decreased.

Figure 9:
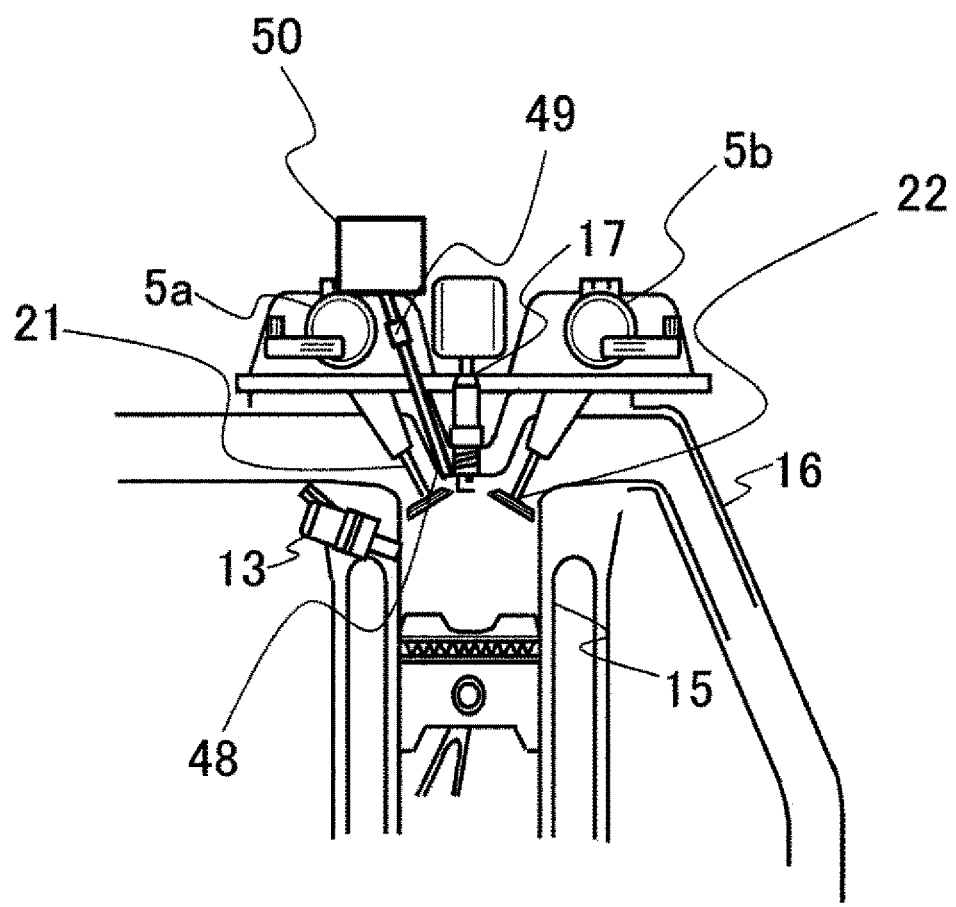
FIG. 9 is a configuration diagram of a vicinity of a cylinder in a case where an auxiliary chamber is provided outside a cylinder and a valve mechanism is arranged in a connection portion between an internal cylinder and the auxiliary chamber according to the second embodiment of the present invention.

FIG. 9 is a configuration diagram of a vicinity of a cylinder in a case where an auxiliary chamber 50 connected with a cylinder 15 is provided outside the cylinder 15 and a valve mechanism 49 is arranged in a connection portion between the cylinder 15 and the auxiliary chamber 50 according to the second embodiment of the present invention. By opening the valve mechanism 49, an internal cylinder volume of the cylinder 15 is enlarged and the compression ratio decreases. By closing the valve mechanism 49, the internal cylinder volume is reduced and the compression ratio increases.

The auxiliary chamber is provided, the auxiliary chamber and the internal cylinder are connected by opening or closing of the valve mechanism, and the volume of the internal cylinder of the cylinder 15 is changed in short time, whereby high-speed change of the compression ratio corresponding to combustion cycle variation becomes possible.

Third Embodiment

In a third embodiment, an embodiment of a configuration and an operation of an engine control device in a case of correcting fuel injection timing as a method of correcting a combustion parameter other than ignition timing by a control unit of an ECU 20 will be described with reference to FIGS. 10 to 12. Description of similar configurations to the first embodiment will be omitted.

Figure 10:
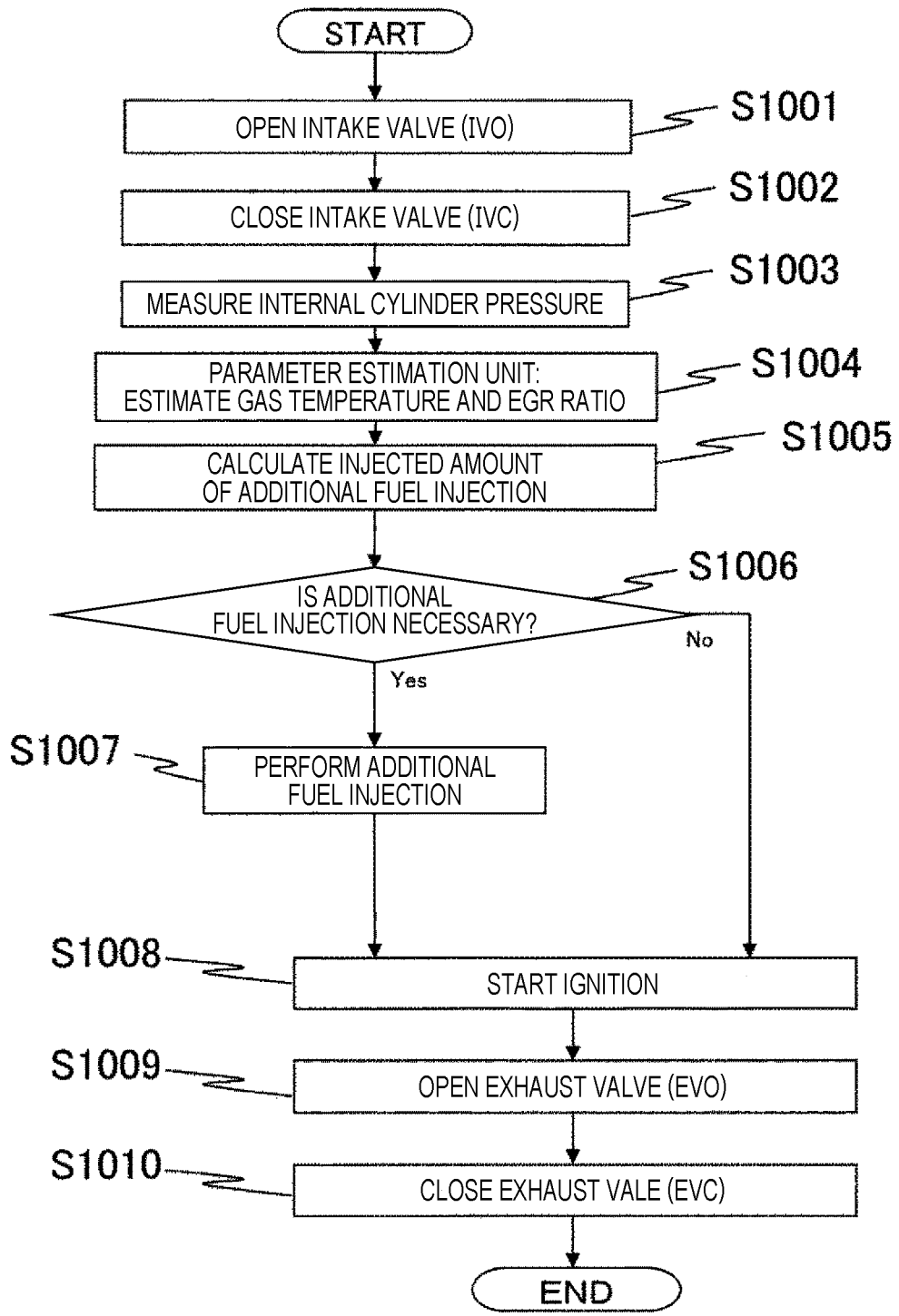
FIG. 10 is a diagram for describing a system block diagram illustrating an example of additional fuel injection control in one cycle according to a third embodiment of the present invention.

FIG. 10 is a system block diagram illustrating an example of fuel injection timing correction control in one combustion cycle according to the third embodiment of the present invention. 51001 to S1004 and S1006 to S1012 are similar to S201 to S204 and S206 to S212 in FIG. 2, and therefore detailed description thereof is omitted. In the present embodiment, the control unit of the ECU 20 calculates a correction value of fuel injection timing by a correction value calculation unit in S1005 on the basis of gas temperature and an EGR ratio. Generally, when a fuel is injected into a cylinder in a compression stroke, gas temperature decreases due to vaporization heat of the fuel, and knocking suppression effect is obtained.

Therefore, an injector injection correction value map for correcting an injected amount or injection timing by an injector 13 according to the gas temperature and the EGR ratio is stored in a storage unit of the ECU 20, similarly to the ignition timing correction value map illustrated in FIG. 5. The correction value calculation unit of the fuel injected amount of the ECU 20 corrects the injection timing of the injector 13 such that additional fuel injection is performed in the compression stroke in a case where the gas temperature rises or the EGR ratio decreases, on the basis of the injector injection correction value map. The control unit of the ECU 20 performs consideration of injection performance of the injector to obtain the corrected injection timing in S1006, and performs additional injection.

Note that, in step S1007, the additional fuel injection is performed before the start of combustion.

Figure 11:
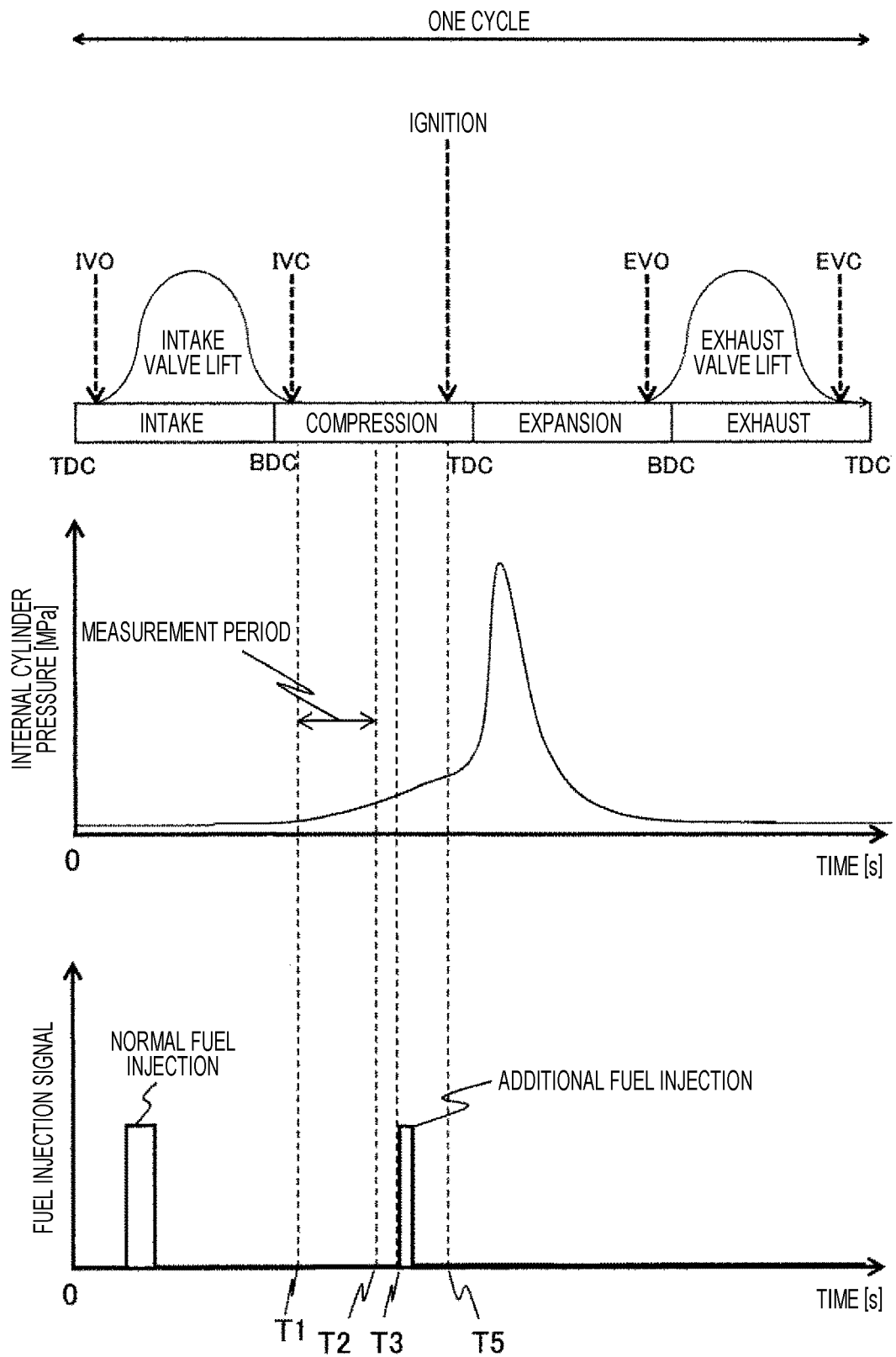
FIG. 11 is a diagram for describing operation of intake/exhaust valves in one cycle and a time chart illustrating temporal change of an internal cylinder pressure and an injection signal in an engine control device according to a third embodiment of the present invention.

FIG. 11 illustrates operation of intake/exhaust valves in one combustion cycle and a time chart illustrating temporal change of an internal cylinder pressure and a fuel injection signal map value in an engine control device according to the third embodiment of the present invention. The fuel is injected in a period in which a value of the fuel injection signal is not zero. When an intake valve 21 is closed at time T1 and an intake stroke is completed, a compression stroke starts, and internal cylinder pressures P1 and P2 and internal cylinder volumes V1 and V2 can be obtained by time T2 in the middle of the compression stroke. A parameter estimation unit estimates the gas temperature and the EGR ratio from these measurement values and at least one of an air-fuel ratio and an intake air mass in S1004. The correction value calculation unit calculates a fuel injection timing correction value on the basis of the estimated gas temperature and the estimated EGR ratio in S1005. The correction value calculation unit of the ECU 20 determines necessity of additional injection in S1006, and does not perform the additional fuel injection in a case where the additional fuel injection is not necessary.

The lower part of FIG. 11 illustrates the corrected fuel injection timing of the injector, and the additional fuel injection is performed at time T3 during the compression stroke. At time T5, ignition is performed after completion of the additional fuel injection, combustion starts, and the internal cylinder pressure reaches a peak. Thereafter, in an expansion stroke, the internal cylinder pressure decreases, an exhaust valve 22 is opened, the gas after combustion is discharged, the pressure nearly drops to an atmospheric pressure, then the exhaust valve 22 is closed, and one combustion cycle is completed.

In this way, the temperature of the gas in the internal cylinder and the EGR ratio before ignition in the compression stroke are obtained, and the fuel injection timing in the compression stroke is corrected on the basis of the obtained gas temperature and the obtained EGR ratio, whereby combustion can be performed at a fuel consumption optimum point in each combustion cycle without disadvantages due to the ignition timing correction and without an additional device necessary for the compression ratio correction, and an amount of fuel consumption can be decreased.

Figure 12:
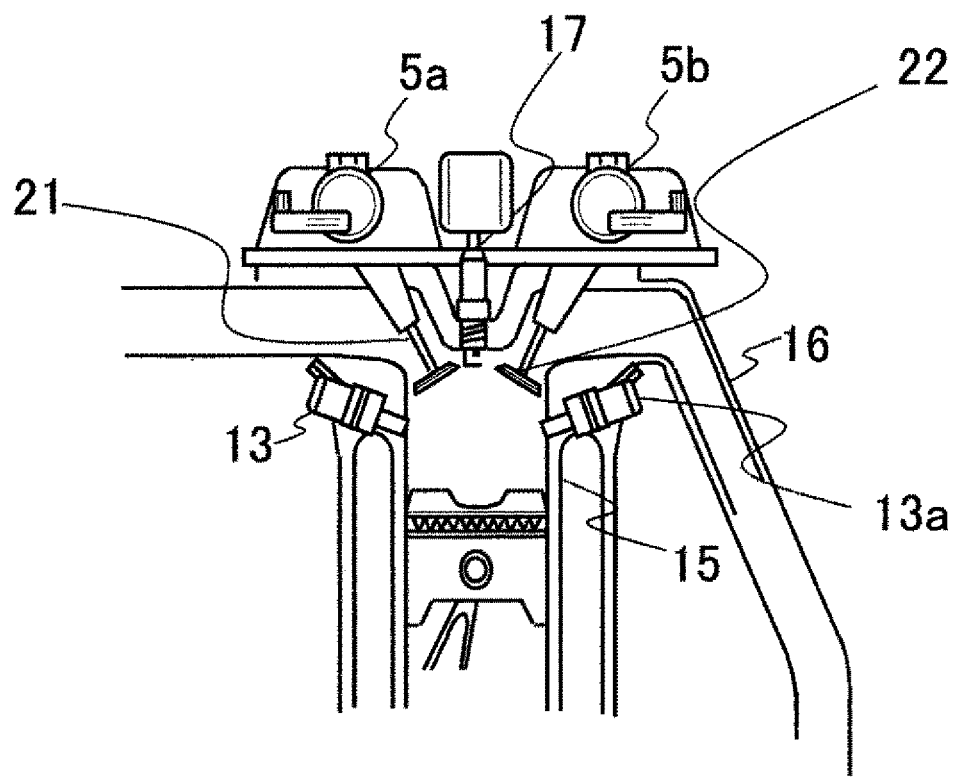
FIG. 12 is a configuration diagram of a vicinity of a cylinder in a case where a sub injector for injecting an additional fuel is disposed in the engine control device according to the third embodiment of the present invention.

FIG. 12 is a configuration diagram of a vicinity of a cylinder in a case where a sub injector 13a for injecting a different type of fuel from the injector 13 as additional fuel injection is disposed in the engine control device according to the third embodiment of the present invention. The control unit of the ECU 20 injects a fuel that promotes self ignition in the same compression stroke into the cylinder in a case where the obtained gas temperature is lower than set temperature or the obtained EGR ratio is larger than a set value. Alternatively, the control unit injects a fuel that suppresses self ignition in the same compression stroke into the cylinder in a case where the obtained gas temperature is higher than set temperature or the obtained EGR ratio is smaller than a set value. As chemical effect due to the fuel injection, a combustion state can be controlled depending on the fuel type to be injected. In a case where a fuel with good ignitability is injected, self ignition is promoted, knocking is more likely to occur, and an advance limit of the ignition timing is reduced. Conversely, in a case where a fuel with poor ignitability is injected, the self ignition is suppressed, knocking suppression effect is enhanced with gas temperature decrease effect due to vaporization heat, and the advance limit of the ignition timing is expanded.

In this way, by injecting the different type of fuel as the additional fuel injection, both the suppression and promotion of the self ignition can be performed, and the combustion state can be controlled with high accuracy.

Fourth Embodiment

In a fourth embodiment, an embodiment of a configuration and operation of an engine control device that performs HCCI combustion by a control unit of an ECU 20 will be described with reference to FIGS. 13 and 14. Description of similar configurations to the first embodiment will be omitted.

Figure 13:
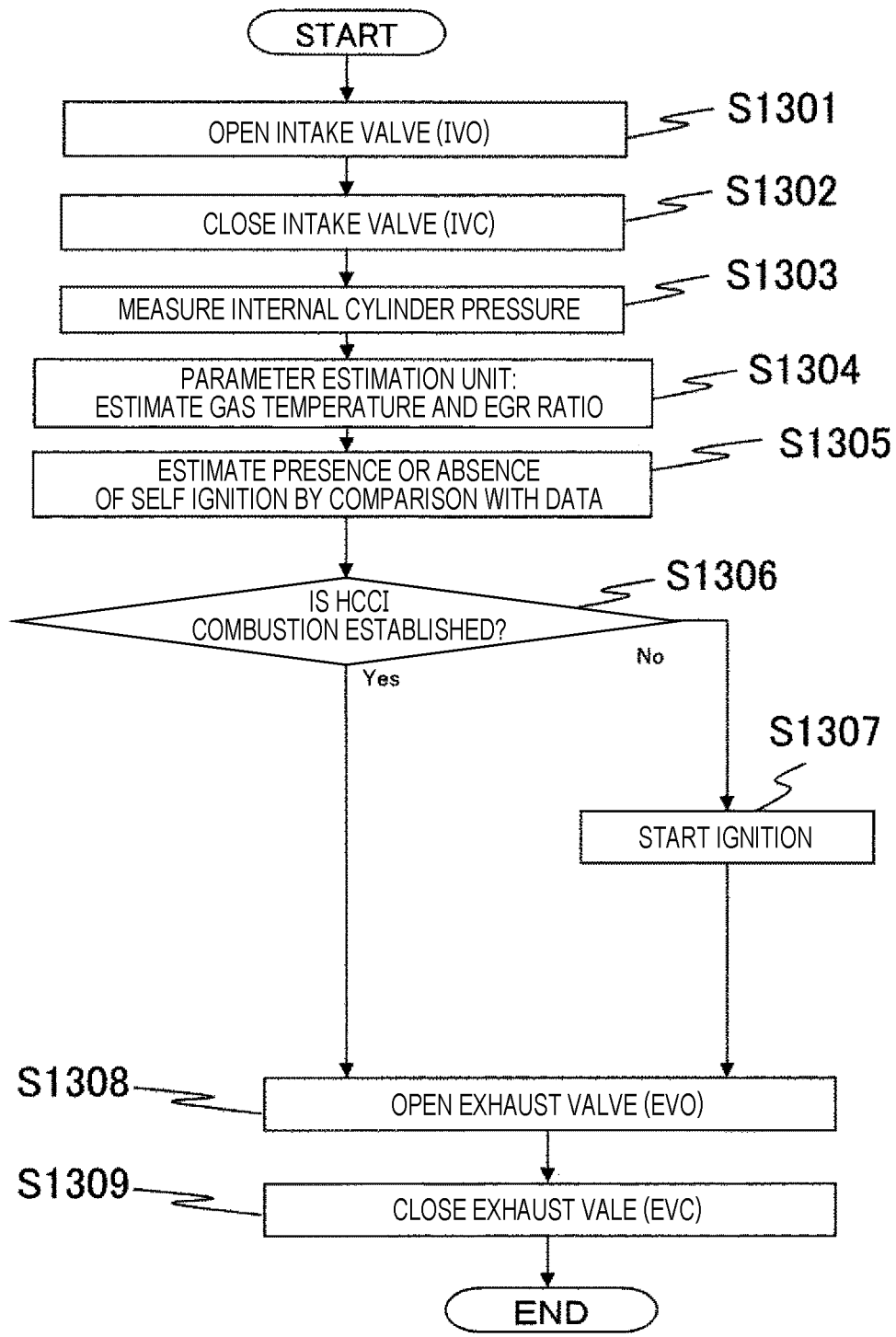
FIG. 13 is a diagram for describing a system block diagram illustrating an example of ignition method correction control in one cycle in an engine control device according to a fourth embodiment of the present invention.

FIG. 13 is a system block diagram illustrating an example of ignition method correction control in one combustion cycle in an engine control device according to the fourth embodiment of the present invention.

S1301 to S1304 and S1308 and S1309 are similar to S201 to S204 and S211 and S212 in FIG. 2, and therefore detailed description thereof is omitted. In the present embodiment, whether a gas is self-ignited at a compression top dead center is predicted by comparison with experimental values and the like by a self ignition determination unit in S1305, on the basis of gas temperature and an EGR ratio. In S1306, whether reliable self ignition, that is, HCCI combustion is established is determined, in the case of establishment, an ignition signal is canceled and the operation proceeds to HCCI combustion. In the case where the self ignition is not established, the ignition signal is sent, and forced ignition is performed by an ignition plug 17.

Figure 14:
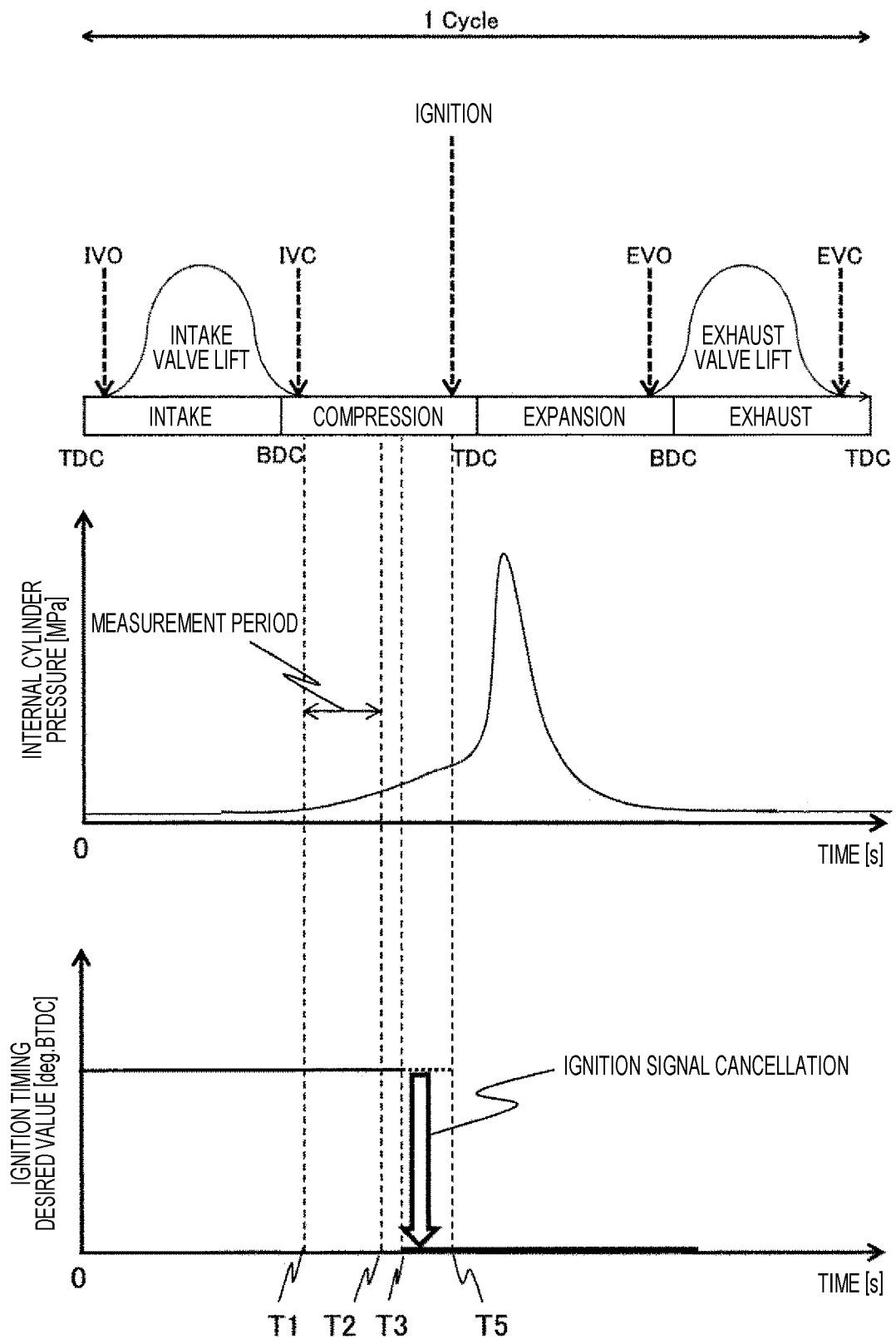
FIG. 14 is a diagram for describing operation of intake/exhaust valves in one cycle and a time chart illustrating temporal change of an internal cylinder pressure and an ignition timing map value in the engine control device according to the fourth embodiment of the present invention.

FIG. 14 illustrates operation of intake/exhaust valves in one combustion cycle and a time chart illustrating temporal change of an internal cylinder pressure and the ignition signal in the engine control device according to the fourth embodiment of the present invention.

When an intake valve 21 is closed at time T1 and an intake stroke is completed, a compression stroke starts, and internal cylinder pressures P1 and P2 and internal cylinder volumes V1 and V2 can be obtained by time T2 in the middle of the compression stroke. The gas temperature and the EGR ratio are estimated by the parameter estimation unit in S1304 from these measurement values and at least one of an air-fuel ratio and an intake air mass. Presence or absence of the self ignition at the compression top dead center is predicted by the self ignition determination unit in S1305 on the basis of the estimated gas temperature and the EGR ratio. The presence or absence of the self ignition, that is, whether the HCCI combustion is established is determined in S1306, and in the case of establishment, the ignition signal is canceled at time T3. At time T5, combustion is started by self ignition or ignition, and an internal cylinder pressure rises and reaches a peak.

That is, the control unit of the ECU 20 switches the combustion by the ignition using the ignition coil 17 and the combustion by the self ignition without using the ignition coil 17 according to the gas temperature and the EGR ratio obtained in the compression process.

In this way, the temperature of the gas in the internal cylinder and the EGR ratio before ignition in the compression stroke are obtained, the presence or absence of the self ignition at the compression top dead center is predicted on the basis of the obtained gas temperature and the obtained EGR ratio, and the ignition signal is cancelled, that is, the combustion proceeds to the HCCI combustion in the case where the self ignition is possible, whereby the HCCI combustion and the SI combustion by the coil ignition can be smoothly switched while transient misfire or knocking is prevented, and a total amount of fuel consumption can be decreased by a decrease in a transient loss.

Next, a method of identifying the gas temperature and the EGR ratio in the present invention will be described with reference to FIG. 15.

Figure 15:
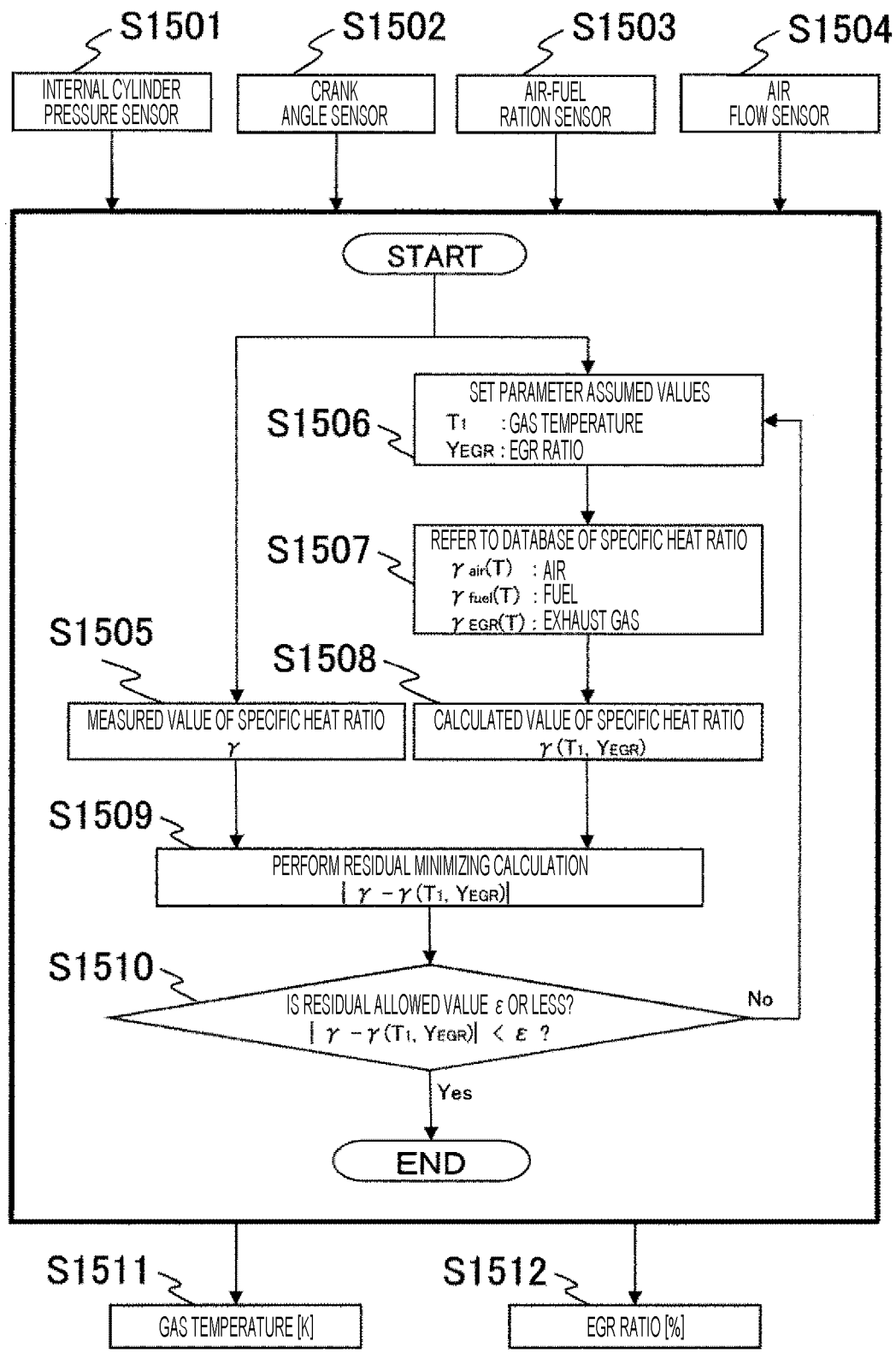
FIG. 15 is a diagram for describing a flowchart illustrating a process of calculating gas temperature and an EGR ratio in the engine control device according to the first embodiment of the present invention.

FIG. 15 is a flowchart illustrating a process of calculating the gas temperature and the EGR ratio in the engine control device according to the first to fourth embodiments of the present invention.

First, amounts of state in the cylinder are acquired by the various sensors. In S1501, an internal cylinder pressure P is acquired from the value of the internal cylinder pressure sensor. In S1502, a current crank angle θ is acquired from the crank angle sensor, and an internal cylinder volume V determined from shape information of the cylinder is acquired, In S1503, an air-fuel ratio CAF is acquired by the air-fuel ratio sensor attached to the exhaust pipe. In S1504, an intake mass m is acquired by the intake air flow sensor.

Next, in S1505, the specific heat ratio is calculated assuming that the compression stroke is adiabatic compression. The internal cylinder pressures P1 and P2 and internal cylinder volumes V1 and V2 are obtained from compression start time T1 to time T2 in the middle of the stroke, and a specific heat ratio measured value γ1 of the air-fuel mixture is calculated by the following Formula (1).

[Mathematical Formula 1]

$$\gamma 1 = -\frac{\ln(P_2) - \ln(P_1)}{\ln(V_2) - \ln(V_1)} \quad (1)$$

Next, in steps S1506 to S1508, the temperature of the gas at the time of IVC and the EGR ratio are assumed, and a calculated value of the specific heat ratio is calculated using a gas state equation.

In S1506, temperature T1 of the gas at the time of IVC and the EGR ratio $Y_{EGR}$ of the gas are set to temporary values. In S1507, a specific heat ratio $\gamma_{AIR}$ (T) of the air, a vaporized fuel $\gamma_{FUEL}$ (I), and a specific heat ratio $\gamma_{EGR}$(T) of the exhaust gas when combusted at a theoretical air-fuel ratio are stored as values measured and stored in advance as temperature-dependent data. Then, in S1508, a specific heat ratio γ2 of the air-fuel mixture in which the air, fuel, and exhaust gas are mixed can be expressed by the following Formula (2) using the air-fuel ratio CAF acquired in S1503.

[Mathematical Formula 2]

$$\gamma 2 = \frac{C_{AF}(1 - Y_{EGR})}{C_{AF} + 1}\gamma_{Air}(T_1) + \gamma_{EGR}(T_1)Y_{EGR} + \gamma_{Fuel}(T_1)\frac{1 - Y_{EGR}}{C_{AF} + 1} \quad (2)$$

Here, in the Formula (2), a mass ratio $\gamma_A$ of the air and a mass ratio $\gamma_F$ of the fuel are expressed by the following Formulas (3) and (4).

[Mathematical Formula 3]

$$\gamma_A = \frac{C_{AF}(1 - Y_{EGR})}{C_{AF} + 1} \quad (3)$$

[Mathematical Formula 4]

$$\gamma_F = \frac{1 - Y_{EGR}}{C_{AF} + 1} \quad (4)$$

Next, a state equation of a cylinder gas at the time of IVC is expressed using the intake air mass m acquired in S1504 by the Formula (5).

[Mathematical Formula 5]

$$P_1 V_1 = \frac{m}{1 - \frac{1-Y_{EGR}}{C_{AF}+1} - \frac{C_{AF}+1}{(A/F)_{st}+1}Y_{EGR}} \left( \frac{C_{AF}(1-Y_{EGR})}{(1+C_{AF})W_{Air}} + \frac{1-Y_{EGR}}{(1+C_{AF})W_{Fuel}} + \frac{Y_{EGR}}{W_{EGR}} \right) R_u T_1 \quad (5)$$

Here, in the Formula (5), a mass $M_1$ of the cylinder gas and a gas constant $R_1$ are expressed by the following Formulas (6) and (7) with Ru as a general gas constant.

[Mathematical Formula 6]

$$M_1 = \frac{M_{Air,fresh}}{1 - \frac{1-Y_{EGR}}{C_{AF}+1} - \frac{C_{AF}+1}{(A/F)_{st}+1}Y_{EGR}} \quad (6)$$

[Mathematical Formula 7]

$$R_1 = \left( \frac{C_{AF}(1-Y_{EGR})}{(1+C_{AF})W_{Air}} + \frac{1-Y_{EGR}}{(1+C_F)W_{Fuel}} + \frac{Y_{EGR}}{W_{EGR}} \right) R_u \quad (7)$$

In the Formulas (2) and (5), unknown parameters are only the gas temperature T1 at the time of IVC and the EGR ratio $Y_{EGR}$ of the gas, and the unknown parameters can be obtained by solving the two equations. However, since each of the two equations includes a nonlinear term, it is difficult to directly solve the equations.

Therefore, residual calculation of the measured value γ1 of the specific heat ratio obtained by the Formula (1) and the calculated value γ2 of the specific heat ratio determined by the Formulas (2) and (5) is performed in S1509, and convergent calculation is performed to minimize the residual in S1510, and the unknown temperature T1 and EGR ratio are identified. In the convergent calculation, to suppress an increase in a calculation load due to search, ranges that the gas temperature T1 and the EGR ratio $Y_{EGR}$ can take are prescribed in advance, and then a plurality of values, for example, 30 values are assumed for each of the gas temperature T and the EGR ratio within the ranges, and parallel calculation is performed. From the identification result, the gas temperature T1 is obtained in S1511 and the EGR ratio $Y_{EGR}$ is obtained in S1512.

When the temperature T1 at the time of IVC is determined, the gas temperature at an arbitrary point during compression, including the temperature at the compression top dead center, can be calculated by the following Formula (8).

[Mathematical Formula 8]

$$T_1 V_1^{\gamma-1} = T_2 V_2^{\gamma-1} \quad (8)$$

The engine control device according to the present embodiment identifies the specific heat ratio on the basis of change of an internal cylinder pressure history. Here, qualitative trends of identified parameters will be described. When the gas temperature is high, the specific heat ratio of the air, fuel, and exhaust gas decreases as the temperature rises, and the rise of the internal cylinder pressure becomes gentle. Similarly, when the EGR ratio is high, the ratio of the exhaust gas having the specific heat ratio of about 1.25, which is smaller than the specific heat ratio of about 1.40 of normal-temperature air, increases. Therefore, the specific heat ratio of the gas decreases and the rise of the internal cylinder pressure becomes gentle. Conversely, when the gas temperature is low or the EGR ratio is high, the rise of the internal cylinder pressure becomes steep. The gas temperature and the EGR ratio are identified on the basis of characteristics of the internal cylinder pressure change.

As described above, the control unit of the ECU 20 obtains the gas temperature and the EGR ratio by identifying the specific heat ratio of the gas from the internal cylinder pressure and the internal cylinder volume of the gas in the internal cylinder in the state where both the intake valve 21 and the exhaust valve 22 are closed, and identifying the gas temperature and the EGR ratio that minimize the residual of the specific heat ratio of the air-fuel mixture calculated assuming the gas temperature and the EGR ratio and satisfy the state equation of the air-fuel mixture. In this way, the gas temperature and the EGR ratio are identified by the convergent calculation of the measured value and the calculated value of the specific heat ratio, whereby the temperature of the internal gas at the time of IVC, which cannot be measured by conventional intake temperature sensors, can be predicted.

Here, the air-fuel ratio acquired in S1503 and the intake air mass acquired in S1504 are typically measured on the upstream side of the intake pipe 6. Therefore, the values thereof vary in every combustion cycle. Therefore, the air-fuel ratio CAF and the intake air mass m may be identified as unknown values by providing assumed values and setting search ranges using sensor values as reference values.

Note that, to further suppress the increase in a calculation load by search, the specific heat ratios $\gamma_{AIR}$ (T), $\gamma_{FUEL}$ (T), $\gamma_{EGR}$ (I) that nonlinearly change with the temperature are approximated as straight lines in each section, and linear equations are defined with respect to the assumed temperature, whereby the Formulas (3) and (4) can be analytically solved as simultaneous equations, and the convergent calculation becomes unnecessary.

Note that the present invention is not limited to the above-described embodiments and includes various modifications.

For example, the above embodiments have been described in detail for easy understanding of the present invention, and the present invention is not necessarily limited to one including all the described configurations. Further, a part of the configuration of a certain embodiment can be replaced with the configuration of another embodiment. Further, the configuration of another embodiment can be added to the configuration of a certain embodiment. Further, another configuration can be added to/deleted from/replaced with a part of the configurations of the embodiments.

REFERENCE SIGNS LIST 1 air flow sensor
2 electronically controlled throttle
4 supercharger
4a compressor
4b turbine
5a intake-side variable valve timing mechanism
5b exhaust-side variable valve timing mechanism
6 intake pipe
7 intercooler
9 air-fuel ratio sensor 10 three-way catalyst
11 waste gate valve
12 accelerator opening sensor
13 cylinder direct fuel injection injector
13a cylinder direct gas injection injector
14 intake pressure sensor
15 cylinder
16 exhaust pipe
17 ignition plug
18 piston
20 ECU
21 intake valve
22 exhaust valve
40 EGR pipe
41 EGR valve
42 EGR cooler
43 differential pressure sensor
44 EGR temperature sensor
45 intercooler bypass valve
A46 intercooler bypass valve
B47 intercooler bypass flow path
48 auxiliary chamber connecting pipe
49 auxiliary chamber opening/closing valve
50 auxiliary chamber
100 engine

The invention claimed is:

1. An internal combustion engine control device that controls an internal combustion engine including a cylinder and an exhaust pipe, the internal combustion engine control device comprising:
   a control unit configured to:
      i) estimate an air-fuel mixture gas temperature and a residual gas ratio in a compression stroke of a combustion cycle,
      ii) perform EGR control of controlling an exhaust gas in the exhaust pipe to return to an inner cylinder of the internal combustion engine,
      iii) obtain a temperature of gas in the inner cylinder and an EGR ratio, while both an intake valve and an exhaust valve are closed in the combustion cycle, and
      iv) correct ignition timing in a same combustion cycle as the combustion cycle during which the temperature of the gas in the inner cylinder and the EGR ratio are obtained.

2. The internal combustion engine control device according to claim 1, wherein
   the control unit corrects ignition timing in the same combustion cycle as the combustion cycle on the basis of the obtained gas temperature and the obtained EGR ratio.

3. The internal combustion engine control device according to claim 1, wherein
   an ignition coil for supplying a high voltage to an ignition plug that performs ignition is attached to the internal combustion engine, and
   the control unit corrects rising timing of a secondary-side coil current of the ignition coil in the same combustion cycle as the combustion cycle on the basis of the obtained gas temperature and the obtained EGR ratio.

4. The internal combustion engine control device according to claim 1, wherein
   the control unit corrects ignition timing in the same combustion cycle as the combustion cycle to be retarded as the obtained gas temperature is larger or the obtained EGR ratio is smaller.

5. The internal combustion engine control device according to claim 1, wherein
   the control unit corrects ignition timing in the same combustion cycle as the combustion cycle to be advanced as the obtained gas temperature is smaller or the obtained EGR ratio is larger.

6. The internal combustion engine control device according to claim 1, wherein
   ignition timing is set according to the gas temperature and the EGR ratio, and the ignition timing is set to be retarded as the gas temperature is larger or the EGR ratio is smaller, and
   the control unit corrects the ignition timing in the same combustion cycle as the combustion cycle to become ignition timing set according to the obtained gas temperature and the obtained EGR ratio.

7. The internal combustion engine control device according to claim 1, wherein
   ignition timing is set according to the gas temperature and the EGR ratio, and the ignition timing is set to be advanced as the gas temperature is smaller or the EGR ratio is larger, and
   the control unit corrects the ignition timing in the same combustion cycle as the combustion cycle to become ignition timing set according to the obtained gas temperature and the obtained EGR ratio.

8. The internal combustion engine control device according to claim 1, wherein
   ignition timing is set according to the gas temperature and the EGR ratio on the basis of ignitability of a fuel, and
   the control unit corrects the ignition timing in the same combustion cycle as the combustion cycle to become ignition timing set according to the obtained gas temperature and the obtained EGR ratio.

9. The internal combustion engine control device according to claim 1, wherein
   ignition timing is set according to the gas temperature and the EGR ratio, and the ignition timing is set to an advancement side as a fuel octane number is higher, and
   the control unit corrects the ignition timing in the same combustion cycle as the combustion cycle to become ignition timing set according to the obtained gas temperature and the obtained EGR ratio.

10. The internal combustion engine control device according to claim 1, wherein
    ignition timing is set according to the gas temperature and the EGR ratio, and the ignition timing is set to a retardation side as a fuel octane number is lower, and
    the control unit corrects the ignition timing in the same combustion cycle as the combustion cycle to become ignition timing set according to the obtained gas temperature and the obtained EGR ratio.

11. The internal combustion engine control device according to claim 1, wherein
    the control unit corrects a compression ratio in the same combustion cycle as the combustion cycle on the basis of the obtained gas temperature and the obtained EGR ratio.

12. The internal combustion engine control device according to claim 1, wherein
    a valve that opens or closes a fluid flow path located between an auxiliary chamber outside the cylinder and the internal cylinder of the internal combustion engine is provided, and the control unit opens or closes the valve on the basis of the obtained gas temperature and the obtained EGR ratio.

13. The internal combustion engine control device according to claim 1, wherein
a fuel injection valve that injects a fuel to the internal cylinder is attached to the internal combustion engine, and
the control unit corrects injection timing of the fuel injection valve in the same combustion cycle as the combustion cycle on the basis of the obtained gas temperature and the obtained EGR ratio.

14. The internal combustion engine control device according to claim 1, wherein
an ignition coil for supplying a high voltage to an ignition plug that performs ignition is attached to the internal combustion engine, and
in a case where the obtained gas temperature is lower than a set temperature or in a case where the obtained EGR ratio is larger than a set value,
the control unit injects a fuel that promotes self ignition in a same compression stroke to the internal cylinder.

15. The internal combustion engine control device according to claim 1, wherein
an ignition coil for supplying a high voltage to an ignition plug that performs ignition is attached to the internal combustion engine, and
in a case where the obtained gas temperature is higher than a set temperature or in a case where the obtained EGR ratio is smaller than a set value,
the control unit injects a fuel that suppresses self ignition in a same compression stroke to the internal cylinder.

16. The internal combustion engine control device according to claim 1, wherein
an ignition coil for supplying a high voltage to an ignition plug that performs ignition is attached to the internal combustion engine, and
the control unit performs control to switch between combustion by ignition using the ignition coil and combustion by self ignition without using the ignition coil according to the obtained gas temperature and the obtained EGR ratio.

17. The internal combustion engine control device according to claim 1, wherein
the control unit obtains the gas temperature and the EGR ratio by identifying the gas temperature and the EGR ratio from an internal cylinder pressure.

18. The internal combustion engine control device according to claim 1, wherein
the control unit obtains the gas temperature and the EGR ratio by identifying a specific heat ratio of a gas from an internal cylinder pressure and an internal cylinder volume of the gas in the internal cylinder in the state where both the intake valve and the exhaust valve are closed, and identifying the gas temperature and the EGR ratio that minimize a residual of a specific heat ratio of an air-fuel mixture calculated assuming a gas temperature and an EGR ratio and satisfy a state equation of the air-fuel mixture.

19. The internal combustion engine control device according to claim 1, wherein during the estimate the control unit is configured to perform a convergent calculation of a measured value and a calculated value of a specific heat ratio.

* * * * *